US008639593B1

(12) United States Patent (10) Patent No.: US 8,639,593 B1
Gallagher et al. (45) Date of Patent: Jan. 28, 2014

(54) APPARATUSES, METHODS AND SYSTEMS FOR A COMPLIANCE COORDINATOR

(75) Inventors: Paul J. Gallagher, New York, NY (US); Evan Giller, New York, NY (US); Elaine Immerman, New York, NY (US); Ralph Sanna, Wilton, CT (US); Christopher Fee, Ossining, NY (US); Grace Murphy, Dumont, NJ (US); Brian Smerdell, Charlotte, NC (US); Merrell Rielly, Berkeley Heights, NJ (US); Brian Ragone, Charlotte, NC (US); Denise Lovell, Jamaica Estates, NY (US)

(73) Assignee: Teachers Insurance and Annuity Association of America, New York, NY (US)

( * ) Notice: Subject to any disclaimer, the term of this patent is extended or adjusted under 35 U.S.C. 154(b) by 604 days.

(21) Appl. No.: 12/495,182

(22) Filed: Jun. 30, 2009

(51) Int. Cl.
*G07B 17/00* (2006.01)
*G07F 19/00* (2006.01)
*G06Q 40/00* (2012.01)

(52) U.S. Cl.
USPC .......................................................... 705/30

(58) Field of Classification Search
None
See application file for complete search history.

(56) References Cited

U.S. PATENT DOCUMENTS 5,878,405 A * 3/1999 Grant et al. ...................... 705/39

OTHER PUBLICATIONS

NPL_Spark_Max_Loan, Best Practices for 403(b) Plans Information Sharing, Dec. 5, 2008, 7 pages, downloaded from http://www.sparkinstitute.org/content-files/File/Spark Inst 403_b Information Sharing - Loan Amt Examples 12-5-2008 FINAL.pdf.*
NPL_Spark_IST, Best Practices for 403(b), Information Sharing Technology, Version 1.0, Sep. 4, 2008, 3 pages, downloaded from http://www.sparkinstitute.org/content-files/File/Spark Inst 403b Plans Info Sharing Tech Practices 9-4-08.pdf on Jun. 1, 2011.*
NPL_Spark_Sample, Sample 403(b) Information Sharing Agreement, Version 1, May 7, 2008, 13 pages, downloaded from http://www.sparkinstitute.org/content-files/File/Spark Inst 403b Plans Sample ISA 5-7-2008 Final.doc on Jun. 1, 2011.*

* cited by examiner

*Primary Examiner* — Paul Danneman
(74) *Attorney, Agent, or Firm* — Lowenstein Sandler LLP

(57) ABSTRACT

The APPARATUSES, METHODS AND SYSTEMS FOR A COMPLIANCE COORDINATOR ("COMPLIANCE COORDINATOR") provides a facility for facilitating compliance with regulation of retirement savings plans with multiple plan vendors, including 403(b) plans. In one embodiment, the Compliance Coordinator effects aggregation of data relevant to regulatory compliance across multiple vendors serving retirement savings plans, and sharing of aggregated data among vendors to allow for compliance monitoring and analysis. In one embodiment, the Compliance Coordinator may also provide compliance analysis facilities to analyze aggregated plan data for regulatory compliance, determine compliance statuses, generate compliance reports, and/or the like.

25 Claims, 21 Drawing Sheets

FIGURE 3B

| DATA CATEGORY 3 50 | FIELD 3 55 | SOURCE 3 60 | COMMENTS 3 65 |
|---|---|---|---|
| File Data | Last Updated | System Generated | Date and time stamp of when data was last refreshed |
| Individual Personal Data | SSN | OMNI | Employee's Social Security Number |
| Individual Personal Data | Last Name | OMNI | Last Name |
| Individual Personal Data | Middle Name | OMNI | Middle Name |
| Individual Personal Data | First Name | OMNI | First Name |
| Individual Personal Data | Address 1 | OMNI | Address 1 |
| Individual Personal Data | Address 2 | OMNI | Address 2 |
| Individual Personal Data | City | OMNI | City |
| Individual Personal Data | State | OMNI | State |
| Individual Personal Data | Zip | OMNI | Zip (optional 4 digit with a -) |
| Individual Personal Data | Date of Birth | OMNI | Date of Birth |
| Individual Personal Data | Gender Code | OMNI | Gender Code - Values can be M, F or U |
| Individual Personal Data | Contract # | OMNI | Contract number for individual |
| Individual Personal Data | Employment Status | OMNI | Current employment status of the individual |
| Plan Information | Plan Code | Plan Rules / OMNI | Plan code for the plan |
| Plan Information | Plan Name | Plan Rules / OMNI | Name of plan |
| Plan Information | Plan Type | Plan Rules / OMNI | Type of plan (ie. SRA, GSRA, RA) |
| Plan Information | Contributions Allowed During Suspension (Yes / No) | Plan Rules | Boolean assessment of whether or not individual plans allow contributions during suspension periods. |
| Plan Information | Loans Allowed (Yes / No) | Plan Rules | Boolean assessment of whether or not individual plans allow loans to be disbursed. |
| Plan Information | Length of suspension period | Plan Rules | Duration (in days, weeks or months) of required suspension period upon hardship withdrawal. |
| Individual Plan Data | Institution | OMNI | Institution amount |
| Individual Plan Data | Reduction | OMNI | Reduction amount |
| Individual Plan Data | Deduction | OMNI | Deduction amount |
| Individual Plan Data | Additional Reduction | OMNI | Additional Reduction amount |
| Individual Plan Data | Additional Deduction | OMNI | Additional Deduction amount |
| Individual Plan Data | Total Plan Balance | OMNI | (Calculated) Total plan balance |
| Plan Data | Plan Vendors | OMNI | Financial vendors associated with each plan |
| Plan Data | Date of Last Contribution | OMNI | Date of last contribution to plan. Required to calculate suspension periods for hardship withdrawals |

FIGURE 3C

| DATA CATEGORY 3 50 | FIELD 3 55 | SOURCE 3 60 | COMMENTS 3 65 |
|---|---|---|---|
| Loan Summary | Total # of Loans | Calculated | (Calculated) Total number of loans across all vendors |
| Loan Summary | Total Loan Principal | Calculated | (Calculated) Total principal amount of loans across all vendors |
| Loan Summary | Total Loan Amount Outstanding | Calculated | (Calculated) Total remaining loan balance outstanding across all vendors |
| Loan Summary | Total Loan Amount Available | Calculated | (Calculated) Total amount available for a loan withdrawal for each eligible Institution |
| Individual Loan Data | Loan History - Loan Number | OMNI | Loan numbers of each loan associated with the plan |
| Individual Loan Data | Loan History - Issue Date | OMNI | Issue date of each loan associated with the plan |
| Individual Loan Data | Loan History - Maturity Date | OMNI | Maturity date of each loan associated with the plan |
| Individual Loan Data | Loan History - Status of Loan | OMNI | Status (Active / Paid-off / In Default) of loans associated with the plan |
| Individual Loan Data | Loan History - Principal Amount | OMNI | Principal amount of loans associated with the plan |
| Individual Loan Data | Loan History - Outstanding Amount | OMNI | Amount outstanding of loans associated with the plan |
| Individual Loan Data | Loan History - Repayment Amount | OMNI | (1 year threshold) History of repayment amounts (and corresponding repayment dates) for each loan |
| Individual Loan Data | Loan History - Repayment Date | OMNI | (1 year threshold) History of repayment dates (and corresponding repayment amounts) for each loan |
| Individual Loan Data | Loan History - Missed Payments | OMNI | (1 year threshold) History of missed loan repayments for each loan |
| Individual Loan Data | Loan Availability | OMNI | Total loan amount currently available for withdrawal at the current institution. |
| Hardship Withdrawal Data | Hardship History - Hardship Withdrawal Date | OMNI | History of hardship withdrawal dates |
| Hardship Withdrawal Data | Hardship History - Withdrawal Amount | OMNI | History of hardship withdrawal amounts |
| Hardship Withdrawal Data | Hardship History - Vendor | OMNI | History of vendors which issued hardship withdrawals |
| Hardship Withdrawal Data | Hardship History - Previous Hardships (Yes / No) | Calculated | Boolean assessment of whether or not previous hardships have been issued within a certain threshold. |
| Hardship Withdrawal Data | Suspension Period | Regulatory | Current contribution suspension period (if any) due to a hardship withdrawal. |
| Plan Compliance | Total # of individuals out of loan compliance | Calculated | Count of individuals who have outstanding loan amounts that exceed their maximum loan availability based on plan rules and plan balance. |
| Plan Compliance | Total # of individuals out of suspension period compliance | Calculated | Count of individuals who have made contributions to their plan within the suspension period of a hardship withdrawal. |

FIGURE 5A

| DATA CATEGORY 501 | FIELD 505 | SOURCE 510 | COMMENTS 515 |
|---|---|---|---|
| Plan Summary Data | Total Plan accumulation per participant | Calculated | Total plan accumulation should include the total accumulation for all plans for each individual administered by the plan aggregated at the Client Level. |
| Loan Summary Data | Outstanding Loan Balance per participant | Calculated | Total current loan balance for each individual administered by the institution (Aggregated at the Client Level). |
| Plan Summary Data per Participant | Total available loan amount per participant | Calculated | Total current available loan amount per participant in the plan |
| Individual Data | Employment Status | OMNI | Current employment status of each individual administered by the institution. |
| All Loan Data for Hardship authorization | Outstanding Loans per participant | Calculated | Validate that the participant has exhausted all loans prior to receiving the hardship withdrawal |
| Hardship Data | Hardship transaction code | OMNI | Transaction code of the distribution transaction |
| Hardship Data | Hardship Withdrawal Date | OMNI | History of hardship withdrawal dates |
| Hardship Data | Withdrawal Amount | OMNI | History of hardship withdrawal amounts |
| Hardship Data | Plan-participation status | OMNI | Current status of participant outlines their status within the system to determine if they are eligible for contribution |
| Hardship Data | Employee status | OMNI | Employee status outlines the current status within OMNI for each participant |
| Hardship Data | Suspension Period | Regulatory | Current contribution suspension period (if any) due to a hardship withdrawal. |

FIGURE 5B

| DATA CATEGORY 5 20 | FIELD 5 25 | SOURCE 5 30 | COMMENTS 5 35 |
|---|---|---|---|
| Plan Summary Data per Participant | Total Plan accumulation per participant | Calculated | Total plan accumulation should include the total accumulation for all plans for each individual administered by the plan. |
| Plan Summary Data per Participant | Number of outstanding loans per participant | Calculated | Total number of loans taken from the plan by the participant |
| Plan Summary Data per Participant | Outstanding Loan Balance per participant | Calculated | Total current outstanding loan balance for each individual administered by the Plan |
| Plan Summary Data per Participant | Total available loan amount per participant | Calculated | Total current available loan amount per participant in the plan |
| Plan Summary Data per Participant | Loans in excess of 50% of plan balance | Calculated | Total outstanding loan balances in excess of 50% of total plan accumulation per participant |
| Individual Data | Employment Status | OMNI | Current employment status of each individual administered by the institution. |
| Hardship Data | Hardship Withdrawal Date | OMNI | History of hardship withdrawal dates |
| Hardship Data | Withdrawal Amount | OMNI | History of hardship withdrawal amounts |
| Hardship Data | Suspension Period | Regulatory | Current contribution suspension period (if any) due to a hardship withdrawal. |

FIGURE 6B

Compliance Coordinator

Home | Help | Profile | Logout

Plan Sponsor A

Account Summary

Run Report

Click on the categories below to view a list of participants in each category or you may search by participant on the right.

Total number of participants: 1,500  6 08

Site data is current as of May 8 However, the following vendor debt is older: Acme Investments

| Standard Categories | Participants # | Participants % |
|---|---|---|
| All Loans | 500 | 33% |
| All Hardships | 400 | 27% |
| Loans and Hardships | 100 | 7.5% |
| Any Activity | 1,000 | 67.5% |

6 15

Alert 6 10

| Categories | | |
|---|---|---|
| Loans Greater than $50,000 | 4 | 0.7% |
| Defaulted Loans | 2 | 0.3% |

Participant Search 6 16

Last Name: [      ]
SSN: [      ]
Date of Birth: [      ]
View by Category: [All Accounts ▼]

- All Accounts
- All Loans
- All Hardships
- Loans and Hardships
- Any Activity
- Loans Greater than $50,000
- Defaulted Loans

Reports  6 17
- Account Summary
- All Loans
- All Hardships
- Loans and Hardships
- Any Activity
- Loans Greater than $50,000
- Defaulted Loans

403(b)  6 18
Resources
- Latest IRS requirements for lorem ipsum effecting institutions
- Download whitepaper on 1-1-09 lorem ipsum preparedness
- Lorem ipsum value added content

FIGURE 6D

Compliance Coordinator*

Help | Profile | Logout

Home » Loans and Hardships

Plan Sponsor A

Loans and Hardships 6.21

Participant Search

Last Name: [    ]  SSN: [    ]  Date of Birth: [    ]  View by Category: [All Accounts ▼]

[Reset] [Search] ☐ within results

Run Report

Participants 1 2

| Name | SSN | DOB | Total Highest Outstanding Loan Balance | Number of Loans | Compliant | Total Latest Hardship Amount | Number of Hardships |
|---|---|---|---|---|---|---|---|
| Doe, Jane | XXX-XX-1234 | 05/18/1961 | $5,000.00 | 2 | Yes | $32,000.00 | 3 |
| Demmelmeier, Joe | XXX-XX-2821 | 12/04/1976 | $62,000.00 | 1 | No | $1,000.00 | 1 |
| Eberhart, Sandy | XXX-XX-9372 | 02/04/1973 | $36,000.00 | 4 | Yes | $33,000.00 | 1 |
| Franken, Joseph | XXX-XX-2731 | 07/14/1981 | $92,000.00 | 3 | No | $5,000.00 | 1 |
| Franz, Heath | XXX-XX-0456 | 05/21/1966 | $23,000.00 | 2 | Yes | $23,000.00 | 2 |
| Maplethorpe, Hugh | XXX-XX-6672 | 03/05/1957 | $52,000.00 | 2 | No | $16,000.00 | 1 |
| Nederlander, Sue | XXX-XX-6281 | 11/30/1978 | $62,000.00 | 3 | No | $30,000.00 | 3 |
| Owen, George | XXX-XX-5223 | 01/01/1969 | $12,000.00 | 1 | Yes | $0 | 0 |
| Smith, John | XXX-XX-9121 | 10/18/1980 | $45,000.00 | 4 | Yes | $31,000.00 | 5 |
| Sullivan, John | XXX-XX-0777 | 04/01/1977 | $43,000.00 | 3 | Yes | $5,000.00 | 1 |

12 results found

FIGURE 6E

Compliance Coordinator*

Home ▸ activity ▸ Participant Details

Help | Profile | Logout

Plan Sponsor A

Participant Details

Name: John Doe
SSN: XXX-XX-1111
Date of Birth: 01/12/1970
Maximum Available: $5,000.00
Loan Amount in Plan:
Total Highest Outstanding Balance: $36,000.00

View By Vendor ▼ 6.26

6.25

Participant Search

Last Name:
SSN:
Date of Birth:
View by Category: All Accounts

[Search]

Run Report

6.27
Loans | Hardships 6.30

| Loan Number | Last Updated | Plan ID | Plan Name | Vendor | Loan Origination Date | Original Loan Amount | Highest Outstanding Loan Balance | Current Outstanding Balance | Default |
|---|---|---|---|---|---|---|---|---|---|
| 1001 | 05/08/2008 | 123456789 | A 403(B) Plan | Vendor ABC | 04/01/2005 | $10,000.00 | $10,000.00 | $10,000.00 | No |
| 1002 | 05/08/2008 | 123456789 | A 403(B) Plan | Vendor ABC | 03/20/2006 | $9,000.00 | $10,000.00 | $9,000.00 | Yes |
| 1003 | 05/08/2008 | 123456789 | A 403(B) Plan | Vendor ABC | 04/11/2007 | $8,000.00 | $10,000.00 | $8,000.00 | Yes |
| 1004 | 04/01/2008 | 111111111 | A 403(B) Plan | Vendor 123 | 04/01/2005 | $5,000.00 | $10,000.00 | $5,000.00 | Yes |
| 1005 | 04/01/2008 | 222222222 | A 403(B) Plan | Vendor MNO | 02/01/2007 | $4,000.00 | $10,000.00 | $4,000.00 | Yes |
| 1006 | 04/01/2008 | 222222222 | Universities Research Association 457(B) Deferred Compensation Plan for the Employees of Institution B | Vendor XYZ | 02/01/2007 | $4,000.00 | $10,000.00 | $4,000.00 | Yes |
| 1234567890 | 04/01/2008 | 123456789012 | Universities Research Association 457(B) Deferred Compensation Plan for the Employees of Institution B | Vendor Up to 20 Char | 02/01/2007 | $4,000.00 | $10,000.00 | $4,000.00 | Yes |

FIGURE 6F

Compliance Coordinator*

Home » activity » Participant Details

Any

Help | Profile | Logout

Plan Sponsor A

Participant Details

Name: John Doe
SSN: XXX-XX-1111
Date of Birth: 01/12/1970
Maximum Available Loan Amount in Plan: $5,000.00
Total Highest Outstanding Balance: $36,000.00

View By Vendor ▼

Participant Search

Last Name: 
SSN: 
Date of Birth: 
View by Category: All Accounts

[Search]

Run Report

Loans  Hardships

6 31

6 32

| Hardship Number | Last Updated | Plan ID | Plan Name | Vendor | Latest Hardship Withdrawal Date | Latest Hardship Amount | Hardship Reason |
|---|---|---|---|---|---|---|---|
| 2 | 04/01/2008 | 111111111 | A 403(B) Plan | Vendor ABC | 04/01/2006 | $5,000.00 | Eviction |
| 1 | 05/08/2008 | 123456789 | A 403(B) Plan | Vendor 123 | 04/01/2005 | $5,000.00 | Medical |
| 3 | 04/01/2008 | 222222222 | A 403(B) Plan | Vendor MNO | 04/01/2007 | $5,000.00 | Education |

FIGURE 6G

Compliance Coordinator®

Home

Help | Profile | Logout

ApprovedVendor1    Vendor XYZ

Selection Screen

Please select an institution from the drop-down menu and then enter the social security number of the participant for whom you want to obtain information.

Participant Search    6 40

* Institution:    [Institution C]
* SSN:    [•••••••••]
Last Name:    [          ]
Date of Birth:    [          ]

[Search]

FIGURE 6H

Compliance Coordinator

Help | Profile | Logout
ApprovedVendor1  VendorXYZ

Selection Screen > Participant Details

Print Page

Participant Details

Note: current data has not been received from one or more vendors ⓘ

Name: John Doe
SSN: XXX-XX-1111
Address: 123 Main Street
New York, NY 10000

Maximum Available Loan Amount in Plan: $5,000
M? Total Highest Outstanding Loan Balance: $36,000
M? Highest Outstanding Loan Balance for other vendors: $9,000

6 55

Participant Search

Enter search criteria below.

* Institution: [Institution B ▼]
* SSN: [         ]
  Last Name: [         ]
  Date of Birth: [         ]

* required                [GO]

| Loans | Hardships | | | | | | | |
|---|---|---|---|---|---|---|---|---|
| Loan # | M? Last Updated | M? Plan ID | M? Plan Name | Vendor | Loan Origination Date | Original Loan Amount | M? Highest Outstanding Loan Balance | Current Outstanding Balance | M? Default? |
| Loan #1 | 04/01/2008 | 1234456789 | A 403(B) Plan | Vendor ABC | 04/01/2005 | $10,000 | $10,000 | $10,000 | No |
| Loan #2 | 04/01/2008 | 1234456789 | A 403(B) Plan | Vendor ABC | 04/01/2006 | $9,000 | $9,000 | $9,000 | Yes |
| Loan #3 | 04/01/2008 | 1234456789 | A 403(B) Plan | Vendor ABC | 04/01/2007 | $8,000 | $8,000 | $8,000 | Yes |
| Loan #4 | 04/01/2008 | xxxxxxxxxx | B 403(B) Plan | Vendor X | 04/01/2006 | $5,000 | $5,000 | $5,000 | Yes |
| Loan #5 | 04/01/2008 | xxxxxxxxxx | B 403(B) Plan | Vendor X | 04/01/2007 | $4,000 | $4,000 | $4,000 | Yes |

6 60

APPARATUSES, METHODS AND SYSTEMS FOR A COMPLIANCE COORDINATOR

The instant application directs claims to Apparatuses, Methods and Systems for a Compliance Coordinator (suggested class/subclass: 707/E17.043). However, in order to develop a reader's understanding of the invention(s), the descriptions of the other invention(s) have been compiled into a single application to illustrate and clarify how aspects of these inventions operate independently, interoperate as between individual inventions, and/or cooperate collectively. The application goes on to further describe the interrelations and synergies as between any of the various inventions within the context of an overarching inventive system; all of which is to further ensure compliance with 35 U.S.C. §112.

FIELD

The present invention is directed generally to an apparatuses, methods, and systems of regulatory compliance, and more particularly, to APPARATUSES, METHODS AND SYSTEMS FOR A COMPLIANCE COORDINATOR.

BACKGROUND

Retirement savings plans, such as Internal Revenue Code ("Code") section 403(b) and 401(a) retirement plans, allow participants to invest a portion of their income and allow employers to make contributions to participant accounts on a negative wealth impacter (e.g., tax)-deferred basis in order to encourage savings. As such plans are directed specifically to encourage retirement savings, the Code may limit accessibility of committed funds until a participant has terminated employment or has attained a specified age (e.g., 59 1/2 years). This type of limitation may be enforced by possible loss of negative wealth impacter (e.g., tax) qualification of the plan or contract used to fund the plan if the restrictions are not enforced or by imposition of a negative wealth impacter penalty on withdrawals occurring before the specified age has been reached. Another type of retirement savings arrangement is a Code section 457(b) eligible deferred compensation plan which is available to employees of state governmental and tax-exempt organizations such as public and private universities, the K-12 schools, hospitals, and research foundations.

SUMMARY

Retirement savings plans, including Code section 403(b) plans, are generally subject to detailed regulations, such as Internal Revenue Service (IRS) regulations, that present complex management and/or compliance challenges for plan sponsors. These challenges are compounded when a plan includes multiple vendors, investment providers, third-party administrators, and/or the like (hereinafter, "vendors"). If a plan sponsor maintains two plans and one plan is funded by a single vendor ("X") and the other plan is funded by a single vendor ("Y"), this rule may require the plan sponsor to aggregate information from both vendors X and Y. Prior to the invention(s) described herein, maintaining and/or not exceeding certain thresholds across numerous accounts for a single individual, much less for a collection of individuals in an organization, has been exceedingly difficult to manage, requiring administrators to ascertain and contact numerous accounts and record and tally account holdings. As regulations may increase management complexity with additional various compliance requirements across a number of vendors in an organization's plan, this complexity will grow.

For example, regulations that govern loans from retirement savings plans require that loans taken by a participant be aggregated across all plans of an employer (including plans of related employers) and vendors under all these plans to determine whether a participant has exceeded the limit on loans imposed under the Code. In another example, regulations require a participant to exhaust all available loans from all of the employer's retirement plans and all vendors under these plans before a hardship withdrawal is permitted. This may require a plan sponsor who may or may not have plan accounts associated with multiple vendors under a single plan to aggregate information to ensure compliance across multiple vendors. The Compliance Coordinator (hereinafter, "Compliance Coordinator") facilitates the aggregation and analysis of compliance-pertinent data for all such circumstances, expediting the processing and monitoring of what could otherwise be insurmountably complex compliance data. In one embodiment, the Compliance Coordinator provides facilities for aggregation of data relevant to regulatory compliance across multiple vendors serving retirement savings plans, and for sharing of aggregated data among vendors to allow for compliance monitoring and analysis. In one embodiment, the Compliance Coordinator may also provide compliance analysis facilities to analyze aggregated plan data for regulatory compliance, determine compliance statuses, determine whether requested participant action is permissible, generate compliance reports, and/or the like.

In one embodiment, compliance coordinating processor-implemented method is disclosed, comprising: receiving financial plan activity data associated with at least one financial plan participant from a plurality of financial plan vendors; normalizing the financial plan activity data; consolidating the financial plan activity data into a format that facilitates regulatory compliance; and providing the financial plan activity data for determination of a compliance status associated with a financial activity request.

BRIEF DESCRIPTION OF THE DRAWINGS

The accompanying appendices and/or drawings illustrate various non-limiting, example, inventive aspects in accordance with the present disclosure:

FIGS. 3B and 3C show an implementation of a table containing data output by the data aggregation flow of FIG. 3A in one embodiment of Compliance Coordinator operation;

FIGS. 5A and 5B show implementations of tables containing inputs for the exclusive plan provider implementation and multi-vendor plan provider implementation respectively in embodiments of Compliance Coordinator operation;

FIGS. 6A-6H show implementations of user interfaces in some embodiments of Compliance Coordinator operation.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

In order to address various issues and improve over the prior art, the invention is directed to apparatuses, methods and systems for a Compliance Coordinator. It is to be understood that, depending on the particular needs and/or characteristics of a Compliance Coordinator plan, account, plan participant, vendor, plan sponsor, administrator, report format and/or type, plan data source, data transmission and/or network framework, and/or the like, various embodiments of the Compliance Coordinator may be implemented that enable a great deal of flexibility and customization. The instant disclosure discusses an embodiment of the Compliance Coordinator primarily within the context of 403(b) retirement savings plans having multiple vendors. However, it is to be understood that the system described herein may be readily configured/customized for a wide range of other applications or implementations. For example, aspects of the Compliance Coordinator may be adapted for regulation of 401(k) profit-sharing plans, 401(a) pension plans, 457(b) plans, other pension and welfare benefit plans, insurance plans, and/or the like applications. It is to be understood that the Compliance Coordinator may be further adapted to other implementations and/or regulatory compliance applications.

Compliance Coordinator

Figure 1A:
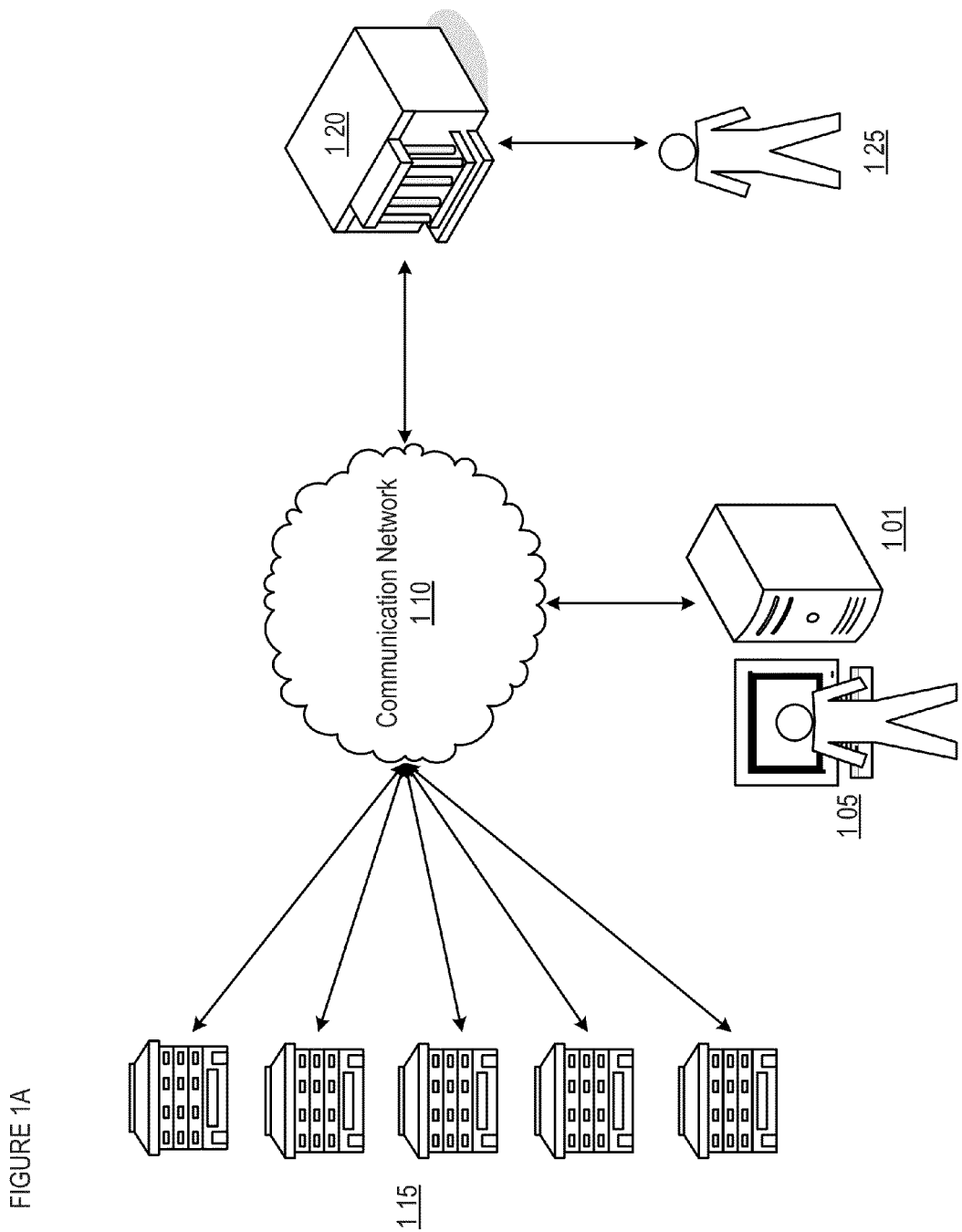
FIG. 1A shows data flow between Compliance Coordinator system components and/or affiliated entities in one embodiment of Compliance Coordinator operation.

FIG. 1A shows data flow between Compliance Coordinator components and/or affiliated entities in one embodiment of Compliance Coordinator operation. In one embodiment, the Compliance Coordinator 101 may serve to facilitate aggregation, normalization, analysis, reporting, and/or the like of financial status and/or activity data associated with retirement savings plans, such as 403(b), 401(k), and 401(a) plans, and/or the like from a variety of status and/or activity data sources, such as financial plan vendors, sponsors, plan administrators, third-party databases, credit reporting agencies, and/or the like. A Compliance Coordinator administrator 105 may coordinate and/or direct Compliance Coordinator functionality, set options, adjust settings, and/or the like such as via a user interface, and/or monitor financial activity data processed by the Compliance Coordinator. A Compliance Coordinator system 101 may be communicatively coupled via a communication network 110 to one or more vendors 115, providing financial services, savings and/or investment plan implementation, managing plan data, and/or the like for plan sponsors 120 and/or plan participants 125. Vendors may provide plan data to the Compliance Coordinator and/or receive aggregated, normalized, analyzed, and/or otherwise processed plan data from the Compliance Coordinator for compliance facilitation.

One or more vendors 115 may further be coupled to a plan sponsor 120 in order to receive new financial status and/or activity updates. For example, in one implementation, a plan participant 125 may request, through his or her plan sponsor 120, a loan, hardship withdrawal, or other distribution based on a retirement savings plan, such as a 403(b) plan, from one or more vendors 115 administering the plan. The one or more vendors 115 may then request plan data, plan participant data, compliance statuses, and/or the like from the Compliance Coordinator 101 based on an inquiry or on the financial activity request received from the plan participant 125.

Figure 1B:
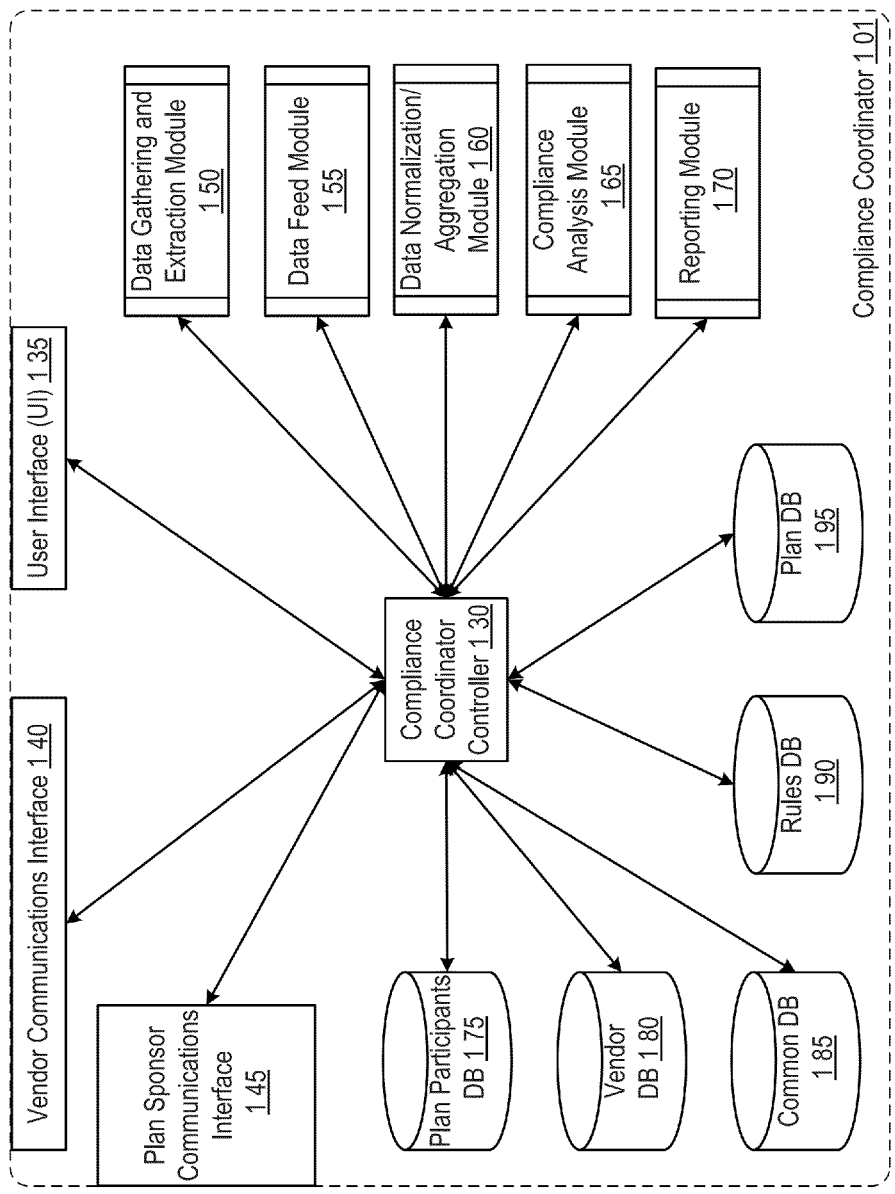
FIG. 1B shows aspects of Compliance Coordinator system components in one embodiment of Compliance Coordinator operation.

FIG. 1B shows aspects of Compliance Coordinator system components in one embodiment of Compliance Coordinator operation. The Compliance Coordinator 101 may contain a number of functional and/or computational modules and/or data stores. A Compliance Coordinator controller 130 may serve a central role in some embodiments of Compliance Coordinator operation, serving to orchestrate the reception, generation and distribution of data and/or instructions to, from, between, and/or among Compliance Coordinator modules, mediate communications with external entities and systems, and/or further analysis of data generated during Compliance Coordinator operation.

In one embodiment, the Compliance Coordinator controller 130 may be housed separately from other modules and/or databases within the Compliance Coordinator, while in another embodiment, some or all of the other modules and/or databases may be housed within and/or configured as part of the Compliance Coordinator controller. Further detail regarding implementations of Compliance Coordinator controller operation, modules, and databases is provided below.

In the implementation illustrated in FIG. 1B, the Compliance Coordinator controller 130 may be configured to couple to external entities via one or more interfaces. For example, the Compliance Coordinator controller 130 may be coupled to a User Interface (UI) 135 by which a Compliance Coordinator user, administrator, vendor, plan participant, plan sponsor, and/or the like may engage, direct, select, and/or the like Compliance Coordinator functionality, operations and/or data. In one implementation, the UI 135 may provide for display of a graphical user interface, such as may be implemented as and/or provided through a web page interface. In one implementation, UI 135 may be employed by a Compliance Coordinator administrator to enter Compliance Coordinator settings and controls, adjust Compliance Coordinator control parameters, monitor, implement functional updates, and/or the like. In further implementations, UI 135 features may be engaged to provide plan data, request aggregated compliance-related plan data, request compliance statuses, request and/or generate reports, access regulatory rules, plan details, plan participant histories, plan sponsor summaries and/or the like. In one implementation, the UI may further include facilities to interface with and/or control one or more report generation systems, printers, display systems, and/or the like for output of Compliance Coordinator aggregated and/or processed data, for example as displayed or printed reports. In one implementation, the Compliance Coordinator may automatically generate a paper report containing plan participant data, compliance statuses, and/or the like along with a printed address label corresponding to one or more vendors to whom the report is being sent in order to facilitate postal mail transmittal of plan and/or plan participant data, compliance information, and/or the like. The Compliance Coordinator controller 130 may further be coupled to a vendor communications interface 140 configured to transmit and/or receive plan data, plan participant status and/or financial activity data, aggregated and/or normalized plan data, compliance information and/or statuses, and/or the like. The Compliance Coordinator controller 130 may further be coupled to a plan sponsor communications interface 145 configured to receive plan participant activity requests, loan requests, hardship withdrawal requests, and/or the like and/or to send plan and/or plan participant data, compliance statuses, loan and/or hardship withdrawal request responses, regulatory rules, and/or the like.

In one implementation, the Compliance Coordinator controller 130 may also be coupled to a plurality of modules configured to implement Compliance Coordinator functionality and/or services. In one implementation, the Compliance Coordinator controller 130 may be coupled to a data gathering and extraction module 150 configured to automatically generate data files containing plan and/or plan participant data; configure data in one or more standardized data file formats compatible with multiple vendors; extract plan data, such as from vendor databases and/or supplied data files, on an automatic, scheduled, periodic, administrator controlled, and/or the like basis; and/or the like. In one implementation, security and/or governance controls commensurate with privacy standards of the Gramm-Leach-Bliley Financial Services Modernization Act (GLB) may be implemented in conjunction with data extraction procedures, such as but not limited to audit trails, access controls, encryption of data transmissions, and/or the like to ensure the integrity and/or privacy of extracted plan and/or plan participant data. In one implementation, extracted data may be converted into a format in accordance with best practices set by one or more third-party agencies, such as the Society of Professional Asset-Managers and Record Keepers (SPARK). In an implementation wherein the plan data managed by the Compliance Coordinator correspond to 403(b) plans, extracted and/or aggregated data may be formatted in accordance with the Best Practices for 403(b) and Related Retirement Plans Information Sharing—Minimum and Comprehensive Data Elements standards set by SPARK, and/or SPARK standards as updated and/or amended. [These data sharing best practices identify both (a) the minimum data sharing elements required to support a plan that has adopted the model language published in Rev. Proc. 2007-71, and (b) the additional data sharing elements that an employer and vendor may agree to share to support plan features in addition to those addressed by the moel language (e.g., employer contributions or Roth features).]

In one implementation, the Compliance Coordinator controller 130 may further be coupled to a data feed module 155 configured to provide extracted data for transport, upload, and/or the like, such as via a secure method of transportation, to the Compliance Coordinator and/or Compliance Coordinator facilities. In one implementation, data files and/or transmissions thereof may be administered remotely and/or automatically, such as via regularly scheduled application triggers. In one implementation, error handling procedures are enforced to ensure the occurrence of file generation based on one or more agreed-upon schedules.

In one implementation, the Compliance Coordinator controller 130 may further be coupled to a data normalization/aggregation module 160 configured to retrieve and/or aggregate plan data provided by one or more plan vendors. In one implementation, the data normalization/aggregation module 160 may automatically retrieve vendor-provided data, such as from vendor drop-boxes, based on triggers, on a pre-set and/or periodic basis, based on Compliance Coordinator administrator instructions, and/or the like. In an alternative implementation, a vendor may manually upload one or more data files for processing by the data normalization/aggregation module 160. Received data files may be extracted, normalized and/or transformed into one or more appropriate data formats, loaded in to a data warehouse for use in reporting and/or compliance analytics, and/or the like.

In one implementation, the Compliance Coordinator controller 130 may further be coupled to a compliance analysis module 165 configured to organize received data, such as based on a plan, plan participant, plan sponsor, and/or the like. In one implementation, the compliance analysis module 165 may provide plan administrators, vendors, Compliance Coordinator administrators, and/or the like with information pertaining to loan and/or hardship withdrawal activity, or other distribution activity, on an individual plan participant, plan sponsor, plan type, across-all-vendors, and/or the like basis. In one implementation, the analysis module may further be configured to determine an appropriate level of access and/or detail for a given data recipient in order, for example, to provide a vendor with just enough information to allow the vendor to determine whether or not a particular financial activity request, such as a loan or hardship withdrawal request, is compliant with applicable regulations, should be granted, and/or the like. Information may, in one implementation, be provided to vendors via a web interface. In one implementation, the compliance analysis module 165 may be configured to interact with a rules/regulations database and/or to analyze provided data in conjunction with rules in order to determine compliance statuses associated with plan data, plan participant data, financial activity requests, loan requests, hardship withdrawal requests, and/or the like.

In one implementation, the Compliance Coordinator controller 130 may further be coupled to a reporting module 170 configured to generate and/or provide standard, customized, and/or user-defined reports, which may be distributed to plan administrators, vendors, plan sponsors, plan participants, Compliance Coordinator administrators, and/or the like. In one implementation, the Compliance Coordinator and/or reporting module 170 may be configured to accommodate compliance reporting and analysis for an exclusive plan provider, vendor, and/or the like. In an alternative implementation, the Compliance Coordinator and/or reporting module may be configured to accommodate compliance reporting and analysis for a plurality of plan providers, vendors, and/or the like.

In one implementation, the Compliance Coordinator controller 130 may further be coupled to one or more databases configured to store and/or maintain Compliance Coordinator data. A plan participants database 175 may contain data pertaining to plan participants and/or plan sponsors, plan participant and/or sponsor profiles, plan histories, financial and/or account activity and/or status data, loan and/or hardship withdrawal records, and/or the like. A vendor database 180 may contain vendor profiles, associated plans, plan participants, plan participant data and/or associated financial activity data, data extraction and/or feed schedules, security and/or authentication data, formatting information, and/or the like. A common database 185 may contain shared aggregated plan and/or plan participant data accessible to all participating vendors and/or a subset of qualified vendors. The common database 185 or a rules database 190 may contain plan rules, compliance conditions, IRS and/or other agency regulations, vendor rules, and/or the like. In addition, a common database 185, a rules database 190, and/or a plan database 195 may contain plan terms, account activity history, plan statuses, alerts, and/or the like.

Figure 2:
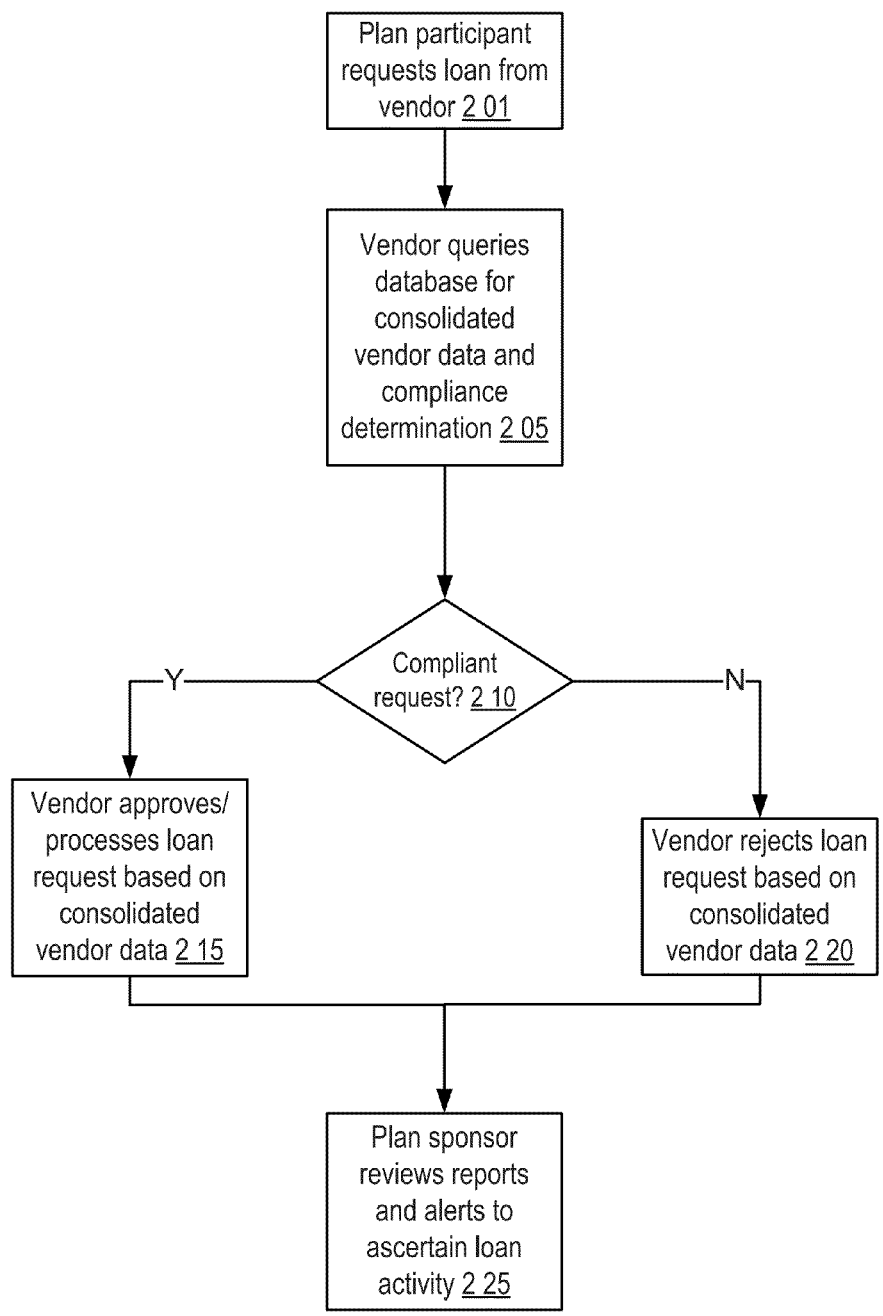
FIG. 2 shows aspects of an implementation of logic flow for loan request processing in one embodiment of Compliance Coordinator operation.

FIG. 2 shows aspects of an implementation of logic flow for loan request processing in one embodiment of Compliance Coordinator operation. A plan participant, such as a 403(b) plan enrollee, may request a loan, hardship withdrawal, and/or other activity associated with his or her plan from one or more associated vendors 201. In one implementation, a plan participant activity request is first received by a plan sponsor, who then relays the request to the one or more vendors. The one or more vendors may then query a Compliance Coordinator database for consolidated vendor data to facilitate a compliance determination and/or for compliance status information 205. For example, in one implementation, the Code limits the amount of a loan that a plan participant may take based on his or her 403(b) plan to a maximum of $50,000, wherein the limit applies across all vendors associated with the participant's 403(b) plan. The Compliance Coordinator may aggregate the participant's 403(b) plan data relating to prior loan amounts across all vendors and provide that aggregated data to one or more vendors from which a new loan is requested and/or provide an assessment of whether a new loan request would be in compliance with the regulation. In another example, the Code may restrict hardship withdrawals from a 403(b) plan until all available plan loans have been exhausted. The Compliance Coordinator may aggregate loan data across all vendors and provide aggregated data to a vendor from which a hardship withdrawal request has been made and/or the Compliance Coordinator may itself determine whether the loan limit has been reached to determine whether a hardship withdrawal is in compliance with the applicable rules, Code provisions, regulations, and/or the like. In one implementation, the Compliance Coordinator may provide vendors with just enough information in order to determine whether or not a particular financial activity request, loan, hardship withdrawal, and/or the like should be approved and/or processed.

Once a determination is made as to whether or not the activity request is compliant 210, a vendor may approve and/or process the loan request based on consolidated vendor data for compliant requests 215 and reject non-compliant requests 220. In one implementation, the one or more vendors and/or the Compliance Coordinator may relay reports and/or alerts pertaining to loan activity, compliance statuses, financial activity request approvals and/or denials, and/or the like to a plan sponsor, plan participant, and/or the like 225.

Figure 3A:
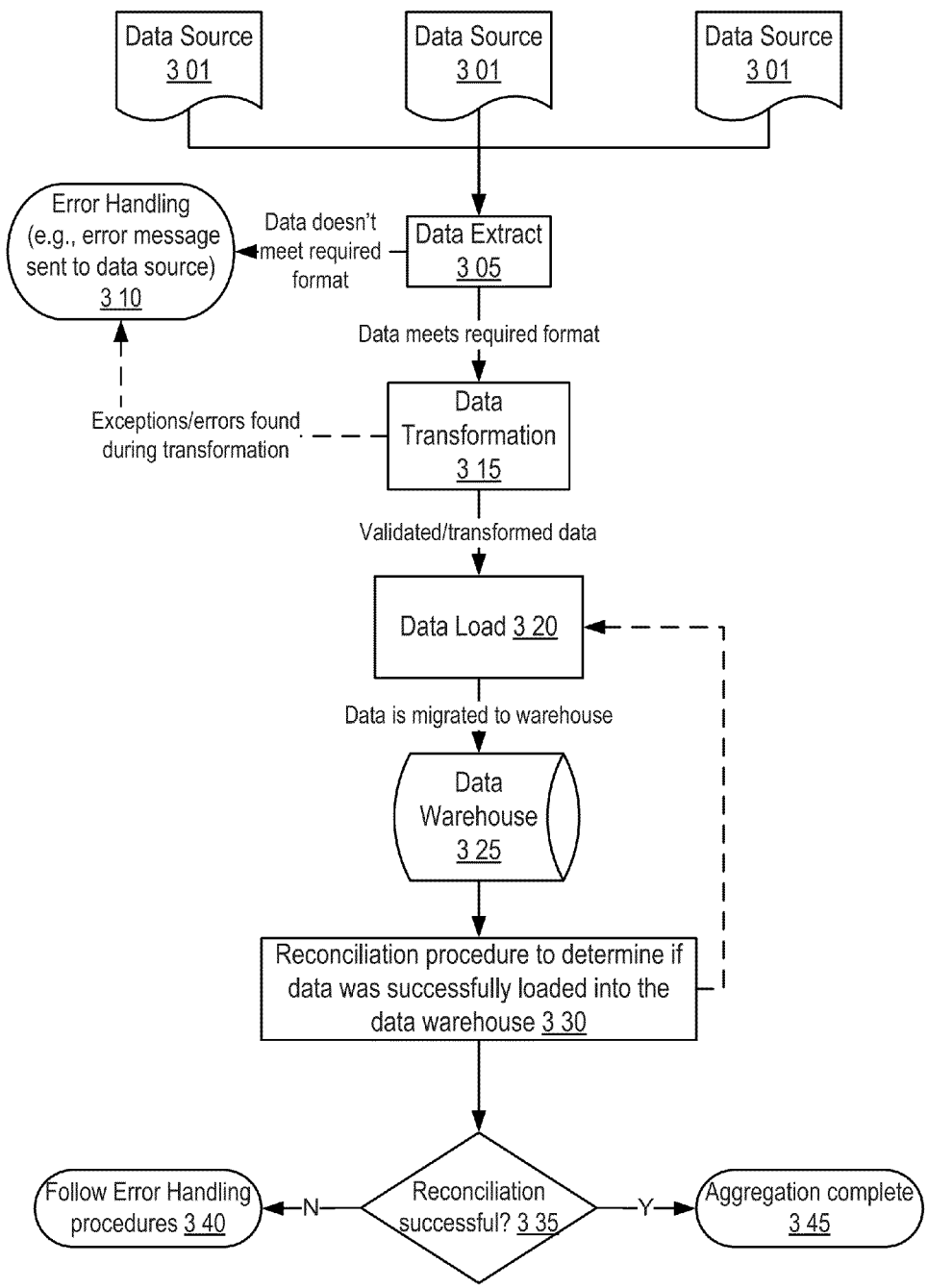
FIG. 3A shows aspects of an implementation of logic flow for plan data aggregation in one embodiment of Compliance Coordinator operation.

FIG. 3A shows aspects of an implementation of logic flow for plan data aggregation in one embodiment of Compliance Coordinator operation. Plan data is received from a plurality of data sources 301, such as vendors. Received plan data may include, but is not limited to, financial activity data, loan withdrawal updates and/or histories, hardship withdrawal updates and/or histories, plan participant balance and profile data, and/or the like. The vendor data is extracted and a determination is made as to whether or not the data meets the required format 305. In one implementation, an approved standard for file feed integrity and/or formatting may be established with all participating vendors and institutions. For example, received data may be required to be in a text format, be in a spreadsheet format, be in a flat file format, conform to a size limitation, conform to language restrictions, and/or the like. Data extraction 305 may retrieve and load multiple data file formats from multiple vendors, plan sponsors, and/or other institutions. In one implementation, vendors may elect to manually upload data files via a user interface. The Compliance Coordinator may implement one or more authentication and/or security features, such as but not limited to passwords, personal identification numbers (PINs), authentication tokens, and/or the like, for verifying authenticity of manually uploaded plan data.

Received data that fails to meet formatting expectations may be subjected to one or more error handling procedures 310, such as logging the error and/or sending an error message to the data source which may request one or more changes to the supplied data in order to place it into a proper formatting condition. For received data that is found to meet the formatting expectations, the transmission may be logged, the sender notified of a successful transmission (e.g., via e-mail and/or other out-of-band communications), and/or the data may be subjected to one or more data transformation procedures 315 in order to perform simple formatting and/or normalization. By way of non-limiting example only, data transformation and/or normalization may include selection of only certain data columns to load, or selection of null columns not to load; translating coded values and/or automated data cleansing (e.g., a source system's encoding of male and female as "1" and "2" respectively may be transformed to "M" and "F" for data warehouse storage); encoding free-form values (e.g., mapping "Male" and "1" and "Mr." into "M"); deriving new calculated values (e.g., summation of balances by contract); joining together and/or reconciling data from multiple sources (e.g., merging data by social security number); summarizing multiple rows of data (e.g., total contract per individual); splitting a column into multiple columns (e.g., putting a comma-separated list specified as a string in one column as individual values in different columns); applying various forms of data validation; applying audit trail triggers; and/or the like.

Non-limiting examples of audit trail triggers that may be implemented by the Compliance Coordinator and/or inserted into one or more received data files include date/time/filename of uploaded data extracts from external vendors; date/time/username of failed external log-in attempts; date/time/username of successful log-in attempts; date/time/success/fail of file transfer; success/fail of data load into data normalization/aggregation module; success/fail of data transformation/normalization; success/fail of data load into data warehouse; and/or the like. In one implementation, a data file having a sufficiently large amount of missing data will be held before aggregation with other data and/or may generate a request for further data from one or more vendors to supplement and/or complete the missing data.

Transformed data may then be loaded 320 for aggregation and/or migration to a data warehouse 325 for storage and later retrieval. In one implementation, vendors may be permitted to and/or may choose to supply incremental data instead of an entire data set, whereby such supplied incremental data may be appended to existing data. Submission of a complete data set may, in one implementation, supplant an entire existing data set in the data warehouse. In one implementation, the Compliance Coordinator may implement security and/or governance controls for loaded and/or transmitted data, such as may be commensurate with GLB privacy standards.

In one implementation, the Compliance Coordinator may then undertake automated data reconciliation to ensure that data has not been lost or impermissibly altered during data transformation 330. By way of non-limiting example only, Compliance Coordinator reconciliation procedures may include comparing a count of records in a transformed data file, possibly including rejected records, to the number of records in the corresponding data file at extraction from the data source; ensuring all plans per the extract match the plans participating in the Compliance Coordinator; and/or the like. The reconciliation procedure may further include issuing one or more notifications to a vendor, Compliance Coordinator administrator, and/or the like and/or interrupting the receipt of data feeds in the event that a discrepancy is detected. A determination may be made as to whether reconciliation has been successful 335. If a loss or impermissible alteration of data has occurred, the Compliance Coordinator may undertake error handling procedures 340, such as to re-load data, re-initiate data transformation, log an error for review by Compliance Coordinator administrators, and/or the like. If reconciliation is successful at 335, then data aggregation may be complete 345 and the Compliance Coordinator may proceed to process compliance analytics, reporting, and/or the like.

In one implementation, received financial plan data may take the form of Omni Plus data files, which may be formatted and/or converted to a format that is in accordance with best practices set by one or more third-party agencies, such as SPARK. In an implementation wherein the plan data managed by the Compliance Coordinator correspond to 403(b) plans, aggregated data may be formatted in accordance with SPARK standards as set out in "Best Practices for 403(b) and Related Retirement Plans Information Sharing—Minimum and Comprehensive Data Elements," which is incorporated in its entirety herein by reference.

FIGS. 3B and 3C show an implementation of a table containing data output by the data aggregation flow of FIG. 3A in one embodiment of Compliance Coordinator operation. The illustrated implementation includes columns corresponding to a data category 350, field within that category 355, data source 360, and comments 365 associated with each data element. Sources indicated as OMNI may, in one implementation, correspond to the Sungaard OmniPlus record-keeping system. Although this is one implementation, other record keeping systems may also be employed, including proprietary systems.

Figure 4A:
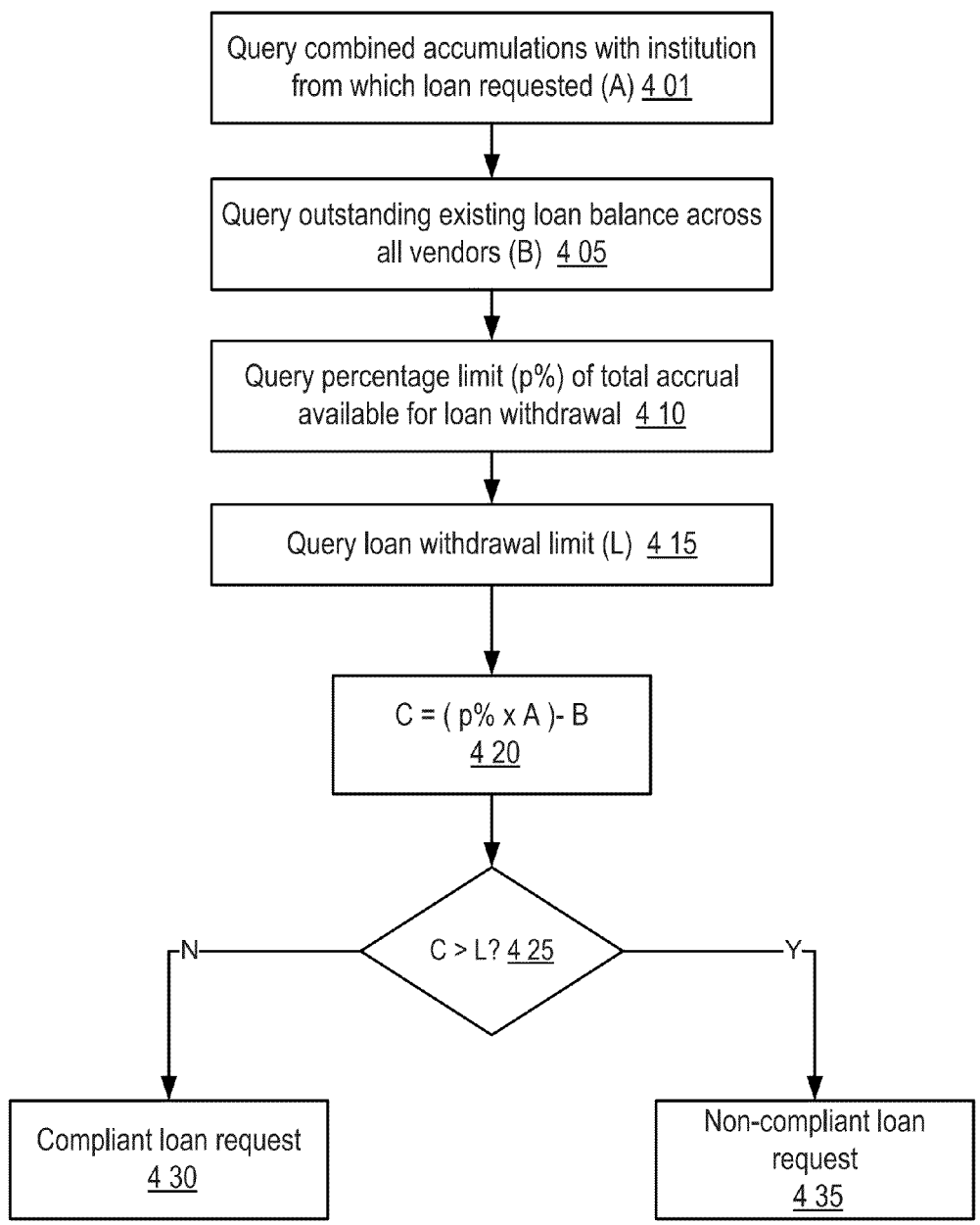
FIGS. 4A-4D show implementations of logic flow for Compliance Coordinator compliance analytics in some embodiments of Compliance Coordinator operation.
Figure 4B:
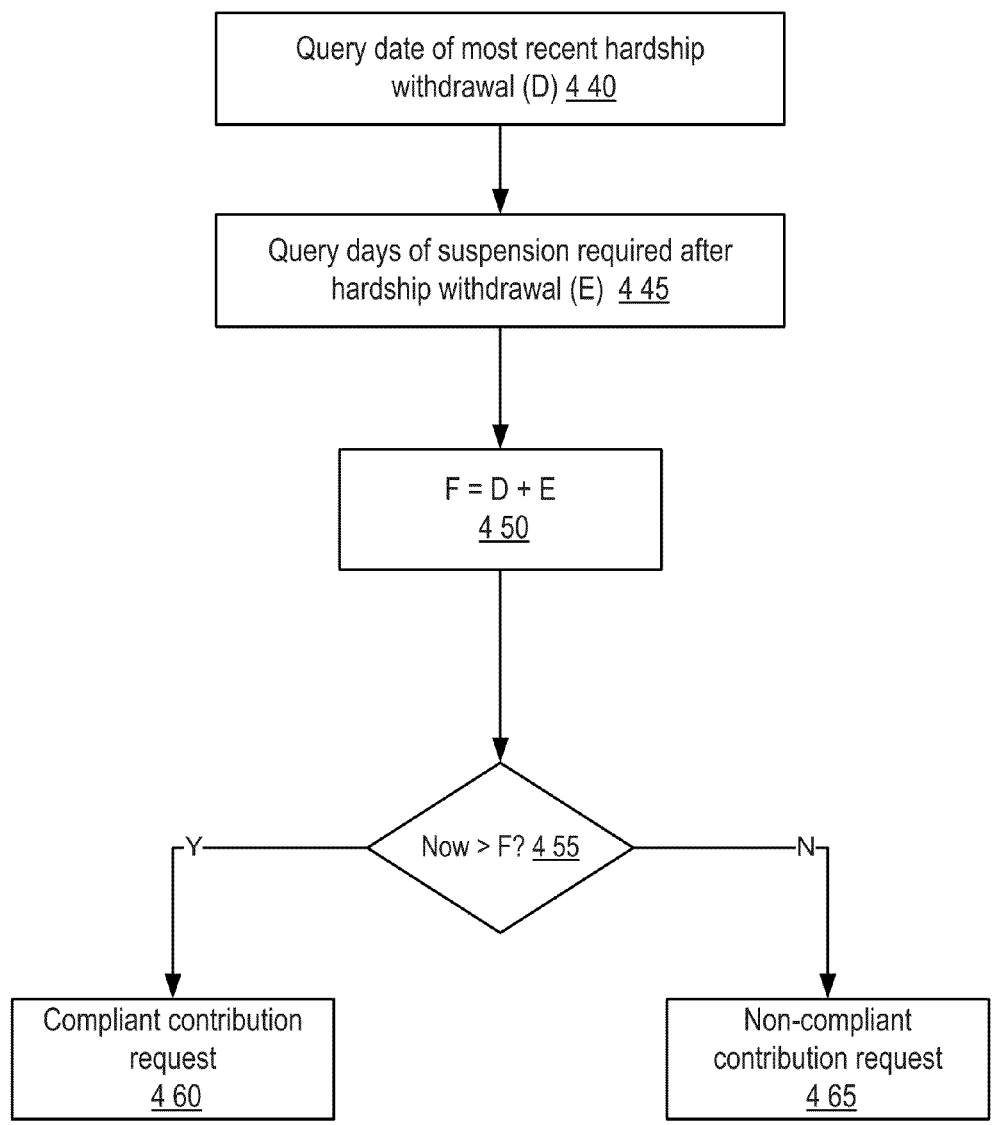
Figure 4C:
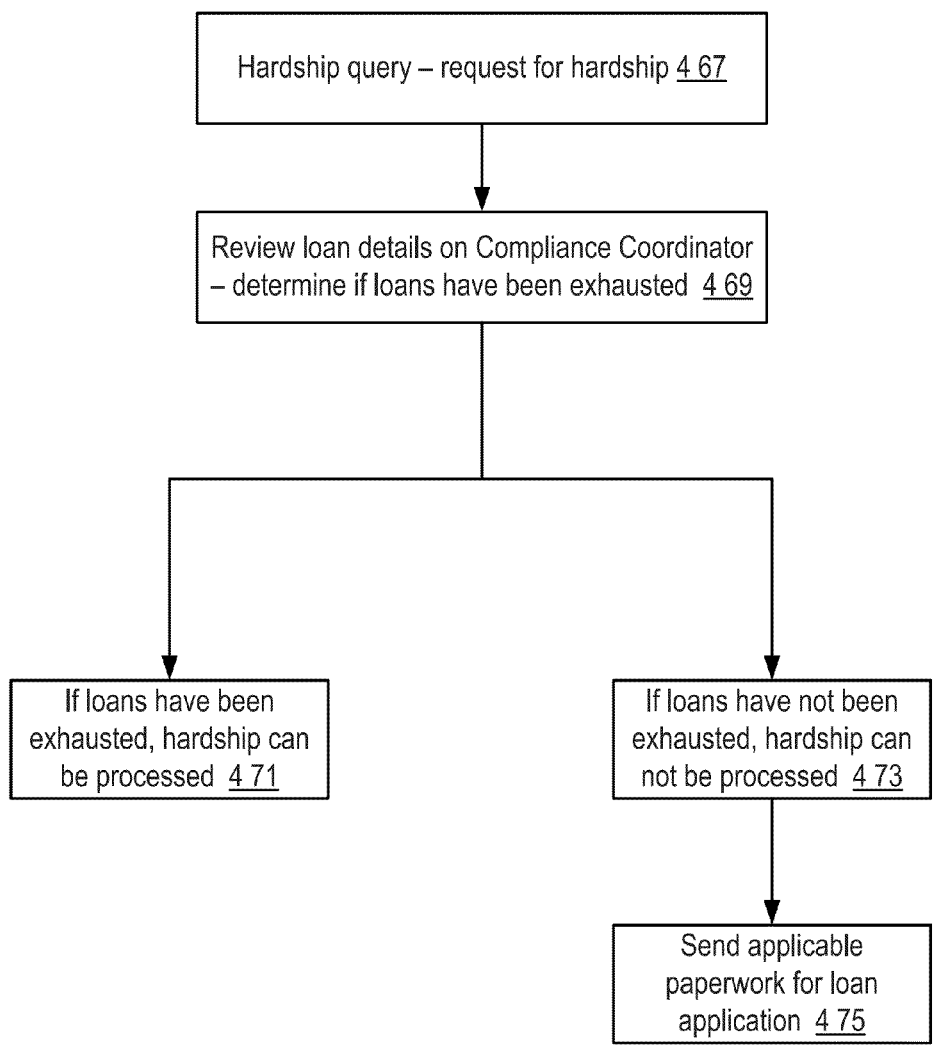

FIGS. 4A-4C show implementations of logic flow for Compliance Coordinator compliance analytics in some embodiments of Compliance Coordinator operation. In FIG. 4A, an implementation of a loan availability determination is illustrated, whereby the Compliance Coordinator may query financial activity and/or status information associated with a particular plan participant to determine whether or not a particular loan request is compliant with a specific regulation. The Compliance Coordinator may query combined accumulations (A) with a particular vendor, institution, and/or the like from which the loan has been requested 401. The Compliance Coordinator may further query an outstanding existing loan balance (B) across all vendors 405 and/or across all plans maintained by a plan sponsor. The Compliance Coordinator may further query a percentage limit (p %) of total accrual available for loan withdrawal 410 and a loan withdrawal limit 415, each of which may be stored in association with a loan availability determination rule. The Compliance Coordinator may then determine a compliance condition by computing a value C in accordance with the formula shown at 420 and deciding whether the value C is greater than the loan withdrawal limit 425. If not, then the plan participant is permitted further loan withdrawals and, therefore, the loan request is compliant 430. Otherwise, the plan participant has already exhausted all available loans on the plan, and the loan request is therefore non-compliant 435. In one implementation, the Compliance Coordinator may further consider the amount of the loan being requested in a calculation similar to that shown at 420 in determining whether the loan is compliant. Alternatively, the Compliance Coordinator may employ the flow of FIG. 4A as a preliminary assessment of whether any loans are permitted, and then perform a second determination as to whether the specific amount in the particular loan request is permissible. In one implementation, the Compliance Coordinator may employ the flow of FIG. 4A, determining whether or not an available loan withdrawal amount has been exhausted, to establish whether a hardship withdrawal request may or may not be granted in accordance with a rule requiring available loans to be exhausted before hardship withdrawals can be made.

In FIG. 4B, an implementation of logic flow for enforcing hardship withdrawal suspension periods is shown. The Compliance Coordinator may query a date of a most recent hardship withdrawal (D) 440, such as may be stored in association with a plan profile and/or plan participant profile. The Compliance Coordinator may further query a number of days of suspension (E) required to transpire after a hardship withdrawal before another contribution can be made 445, such as may be stored in association with a plan rule and/or regulation. The Compliance Coordinator may then compute a quantity (F) comprising a sum of the date D and number of days E 450 and determine whether or not the current date is greater than F 455. If so, then enough time has transpired for a new contribution, and thus the contribution may be deemed compliant on this basis 460. Otherwise, the contribution request may be marked as non-compliant 465, by virtue of being too soon since the last hardship withdrawal.

In FIG. 4C, an implementation of logic flow for enforcing loan requirements on hardship withdrawal requests is shown. The Compliance Coordinator may receive a hardship withdrawal request query 467 associated with one or more plans and review loan details associated with those plans to determine whether loans have been exhausted 469. If so, then the hardship request may be processed 471. Otherwise, if loans have not been exhausted, the hardship withdrawal is prevented or restricted 473, and the Compliance Coordinator may, in one implementation, provide applicable paperwork, application information and/or forms, and/or the like for loan application 475.

Figure 4D:
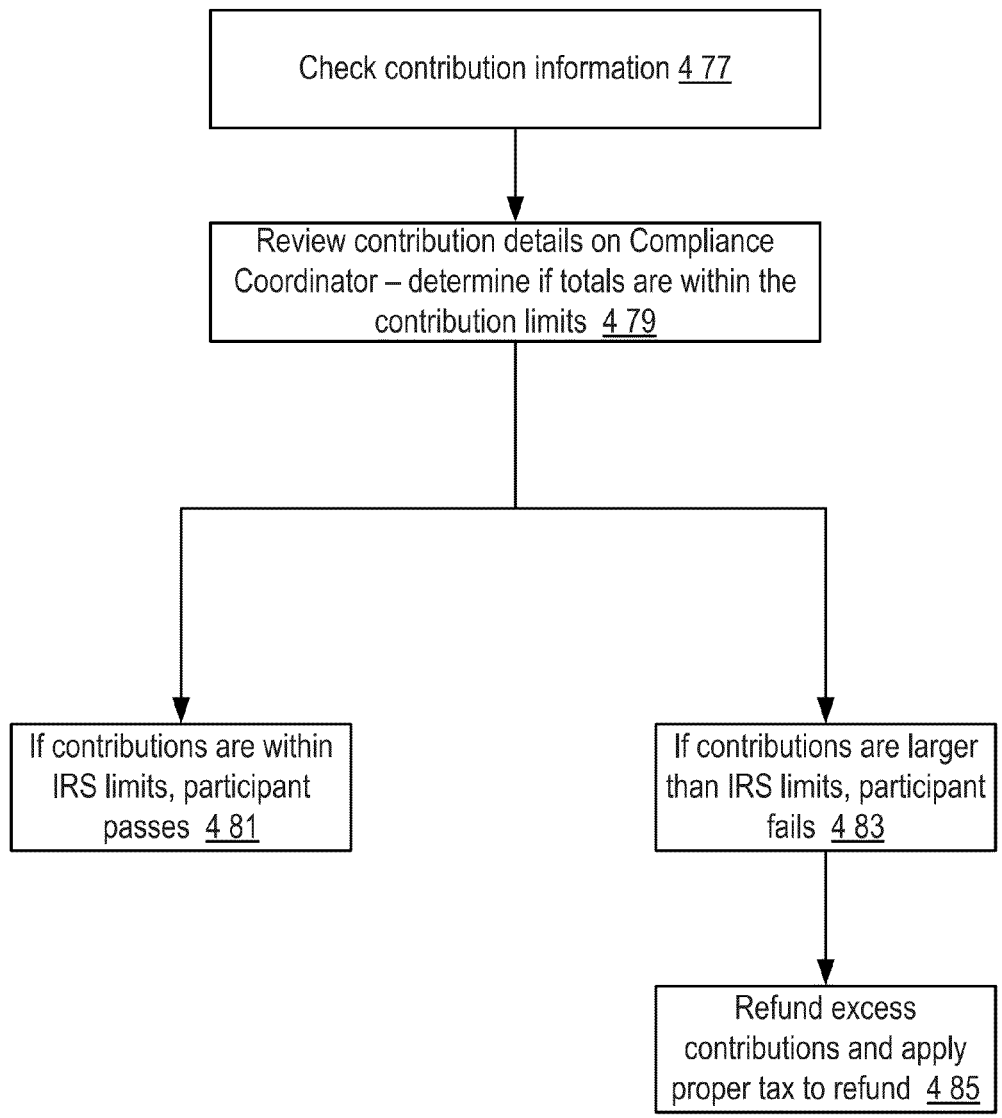

In FIG. 4D, an implementation of logic flow for enforcing contribution limits is shown. The Compliance Coordinator may check contribution information 477, such as may be associated with one or more plans and/or plan participants. The Compliance Coordinator may review contribution details to determine if contribution totals are within specified contribution limits 479, such as may be set by the IRS. If reviewed contributions fall within those limits, the participant may pass, be marked as compliant, and/or the like 481. Otherwise, for contributions exceeding the limits, the participant may fail, be marked as non-compliant, and/or the like 483. In one implementation, the Compliance Coordinator may direct refunding of excess contributions and/or the application of appropriate negative wealth impacters thereto 485.

In addition to determining whether a loan or hardship withdrawal and/or request is compliant with applicable regulations and/or rules, the Compliance Coordinator may be configured to yield a variety of outputs such as, but not limited to, aggregated individual and/or plan data across vendors, loan availability, hardship request availability, hardship suspension periods, and/or the like for administrator review. In one implementation, the Compliance Coordinator may also provide vendors with just enough information to allow them to determine whether or not a particular loan and/or hardship withdrawal should be processed.

The Compliance Coordinator may provide a variety of reporting features to allow Compliance Coordinator administrators, plan administrators, vendors, plan sponsors, plan participants, and/or the like to view and interact with plan data, compliance statuses and analytics, rules/regulations, and/or the like. In one implementation, the Compliance Coordinator may receive a request from a user corresponding to an institution, plan sponsor, and/or the like wherein a plan is administered by a sole vendor, in which case the request may be routed to an interface and/or reporting output configured for an exclusive plan provider. Alternatively, if a data request is received from a user corresponding to an institution associated with multiple vendors, the request may be routed to an interface and/or reporting output configured for a multi-vendor plan provider implementation. FIG. 5A shows an implementation of a table containing inputs for the exclusive plan provider implementation in one embodiment of Compliance Coordinator operation. The illustrated implementation includes columns corresponding to a data category 501, field within that category 505, data source 510, and comments 515 associated with each data element. FIG. 5B shows an implementation of a table containing inputs for the multi-vendor plan provider implementation in one embodiment of Compliance Coordinator operation. The illustrated implementation includes columns corresponding to a data category 520, field within that category 525, data source 530, and comments 535 associated with each data element.

Figure 6A:
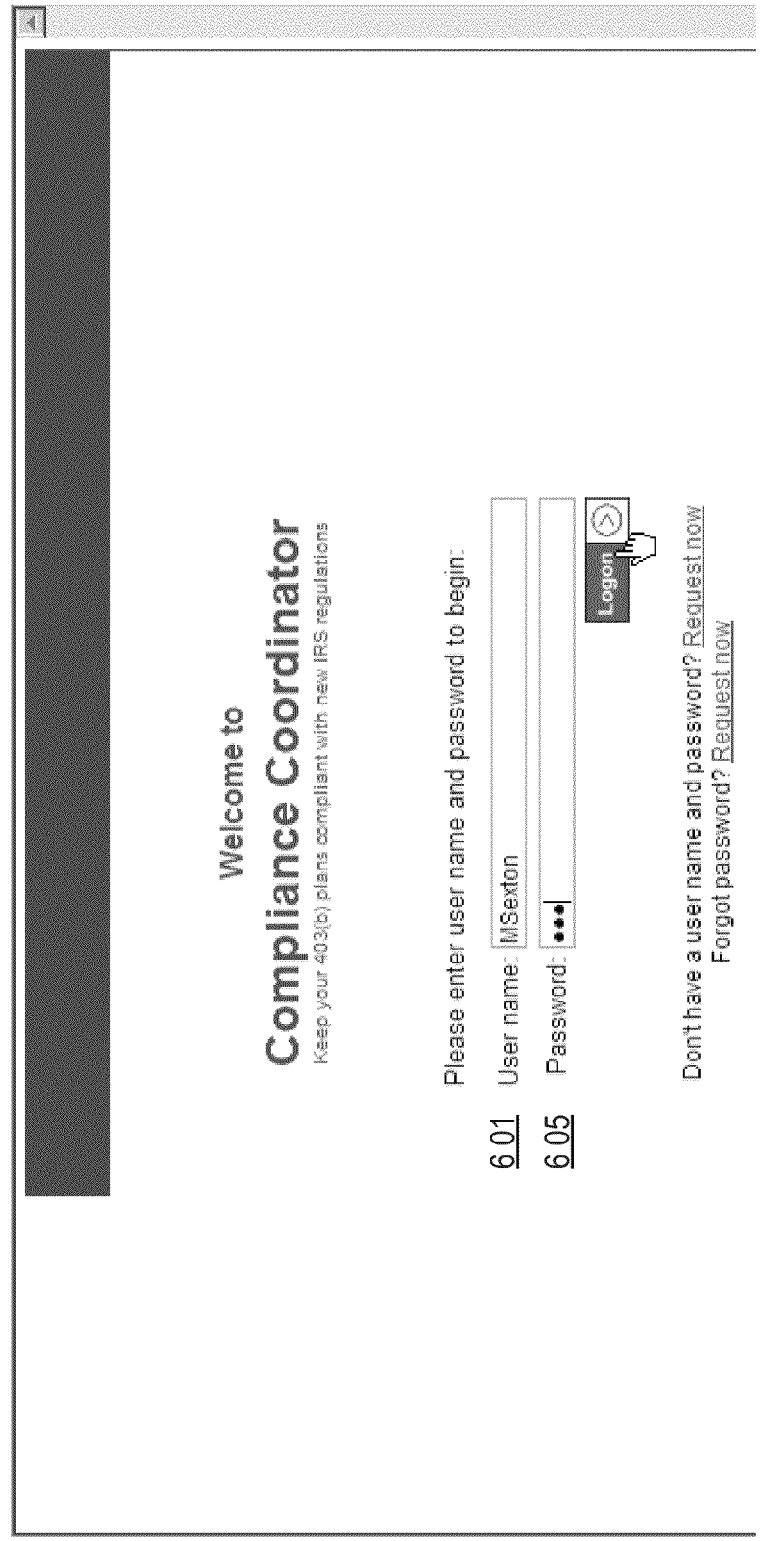
Figure 6C:
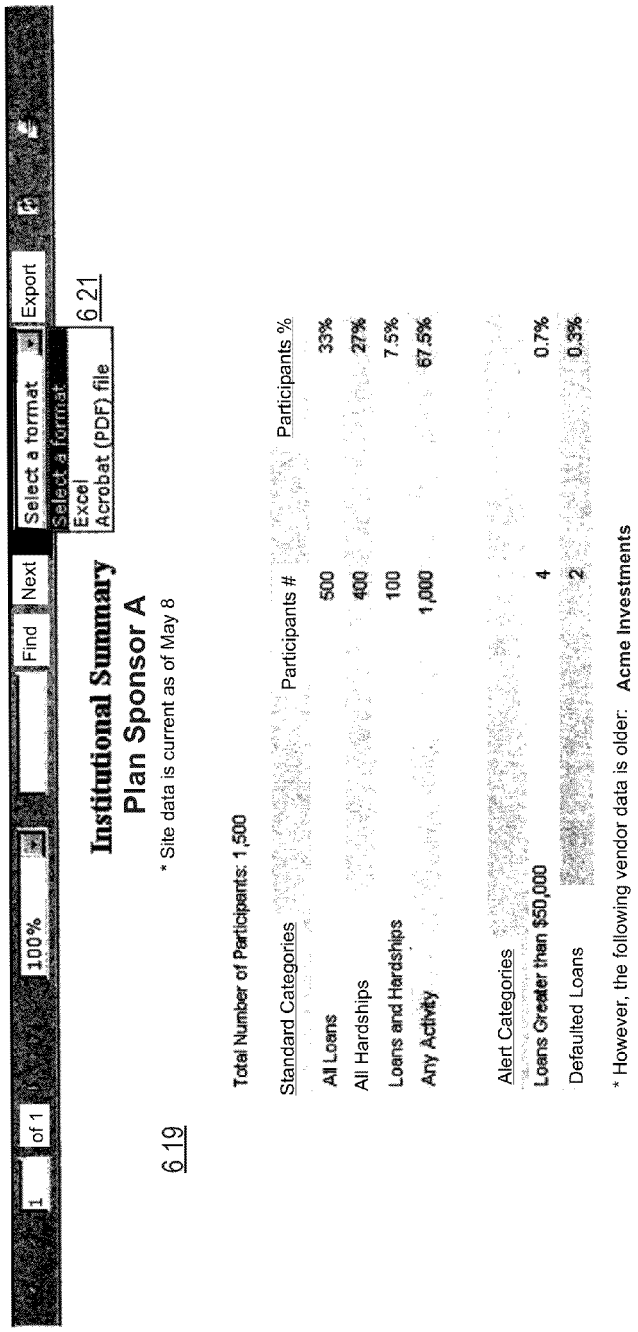

FIGS. 6A-6H show implementations of user interfaces in some embodiments of Compliance Coordinator operation. In one implementation, the interface screens shown in FIGS. 6A-6H may be implemented as web pages, web forms, and/or the like. In FIG. 6A, a plan sponsor login screen is shown, including fields for entry of a user name 601 and password 605. FIG. 6B shows an implementation of a summary report screen, such as may be provided for display to a plan sponsor. The screen includes an indication of the total number of participants 608 associated with a given plan. The screen further includes a table summarizing alert categories, such as non-compliant loans associated with the plan sponsor, (e.g., loan withdrawals in excess of a $50,000 limit, loan defaults, and/or the like), and indicating the number and percentage of affected plan participants 610. The screen further includes a loans and hardships summary table 615, indicating the numbers and percentages of plan participants having taken out loans and/or hardship withdrawals against their plans, and/or performing other activities associated with their plans. The screen may further include interface areas configured to implement searches for particular participants and/or classes of participants 616, report generation 617, provision of plan and/or regulatory information 618, and/or the like. An example of a report page is shown at FIG. 6C, including the report itself 619 and a selectable list of output formats 621, such as, but not limited to, Microsoft Excel, Adobe Portable Document Format (PDF), and/or the like. In one implementation, elements in areas 610, 615, 616, 617 and/or 618 of FIG. 6B may be selectable to link to additional information, new interface screens, web pages, and/or the like. For example, selection of elements from the "All Loans" row of the table at 615 may yield the interface screen in FIG. 6D, which shows an implementation of a screen summarizing plan and/or plan participant data for plan participants who have taken loans against their plans but no hardship withdrawals. The table at 621 shows plan participant information including a name, a redacted social security number, date of birth, a total highest outstanding loan balance, a number of loans, whether or not the loans and/or participant are compliant with applicable regulations, a total latest hardship amount, and a number of hardships. Alert-worthy data, such as an amount of loans exceeding the $50,000 limit or the existence of a default, may be displayed in a manner so as to draw the attention of a user, plan sponsor, administrator, and/or the like (e.g., the data may be blinking, flashing, highlighted, colored, shown in bold, underlined, written in enlarged font, and/or the like). FIG. 6E shows an implementation of an interface screen displaying plan participant-specific details, such as in response to selection of a plan participant from the table at 621 in FIG. 6D. The participant details may include profile data 625, such as census data (e.g., name, social security number, date of birth, etc.) as well as plan-related data, such as a maximum available loan amount, total highest outstanding balance, and/or the like associated with a participant's plan. In one implementation, the interface may further include alerts indicating whether or not the plan participant is in compliance, what aspects of the plan participant's account status or activity may be a cause for concern (e.g., total loan amounts across all vendors exceeds the upper limit in the illustrated implementation), whether the plan participant is eligible for additional loans, hardship withdrawals, and/or the like. The interface may further include interface components configured to provide plan data views associated with a subset of vendors 626, with loans and/or hardships 627, and/or the like. The view in FIG. 6E shows loan information in a table format 630, the loan information associated with one or more plans, each of which may be associated with one or more vendors. The table at 630 includes loan information such as loan number and/or ID, an update time/date, a plan ID, a plan name, a vendor name administering the plan, a loan origination date, an original loan amount associated with each vendor and plan, a highest outstanding loan balance, a current outstanding balance, and whether or not a given loan has been defaulted on. FIG. 6F shows an implementation of an interface screen displaying plan participant-specific details wherein the Hardships option at 631 has been selected. Accordingly, a table showing hardships data associated with one or more plans is shown at 632, including hardship numbers, dates of last update, plan IDs, plan names, vendor names, lates hardship withdrawal dates, latest hardship withdrawal amounts, hardship reasons, and/or the like.

FIG. 6G shows an implementation of a user interface screen such as may be displayed to an approved vendor seeking plan participant data in one embodiment of Compliance Coordinator operation. For example, a plan participant may submit a loan request to a vendor administering part of the plan participant's 403(b) retirement plan, prompting the vendor to seek information about the plan participant and/or one or more plans associated with the participant in order to establish whether the loan request is compliant with applicable regulations. The vendor may submit plan participant information via a participant search interface such as that shown at 640. Participant data may include, but is not limited to, institution and/or plan sponsor, social security number, last name, date of birth, zip code, and/or the like via fields, and the Compliance Coordinator may use that information to retrieve relevant plan and/or plan participant information. FIG. 6H shows an implementation of an interface screen showing plan participant data as may be displayed to an approved vendor in a multi-vendor plan implementation. Like FIG. 6E, the screen in FIG. 6H includes plan participant profile data 655 and a table of plan information associated with the plan participant 660, in this case pertaining to loans. Some information may, however, be redacted or otherwise edited in the display for an approved vendor within a multi-vendor implementation. For example, in the illustrated implementation, the names of one or more vendors besides the approved vendor may be redacted and/or otherwise hidden. In one implementation, only enough information, and no more, is provided to an approved vendor as may be needed to address compliance of a financial activity request with applicable regulations. The interface screen in FIG. 6H may further include alerts indicating whether or not a particular plan participant or activity request is in compliance with applicable regulations, what the nature of any non-compliant issues may be, and/or the like.

Compliance Coordinator Controller

Figure 7:
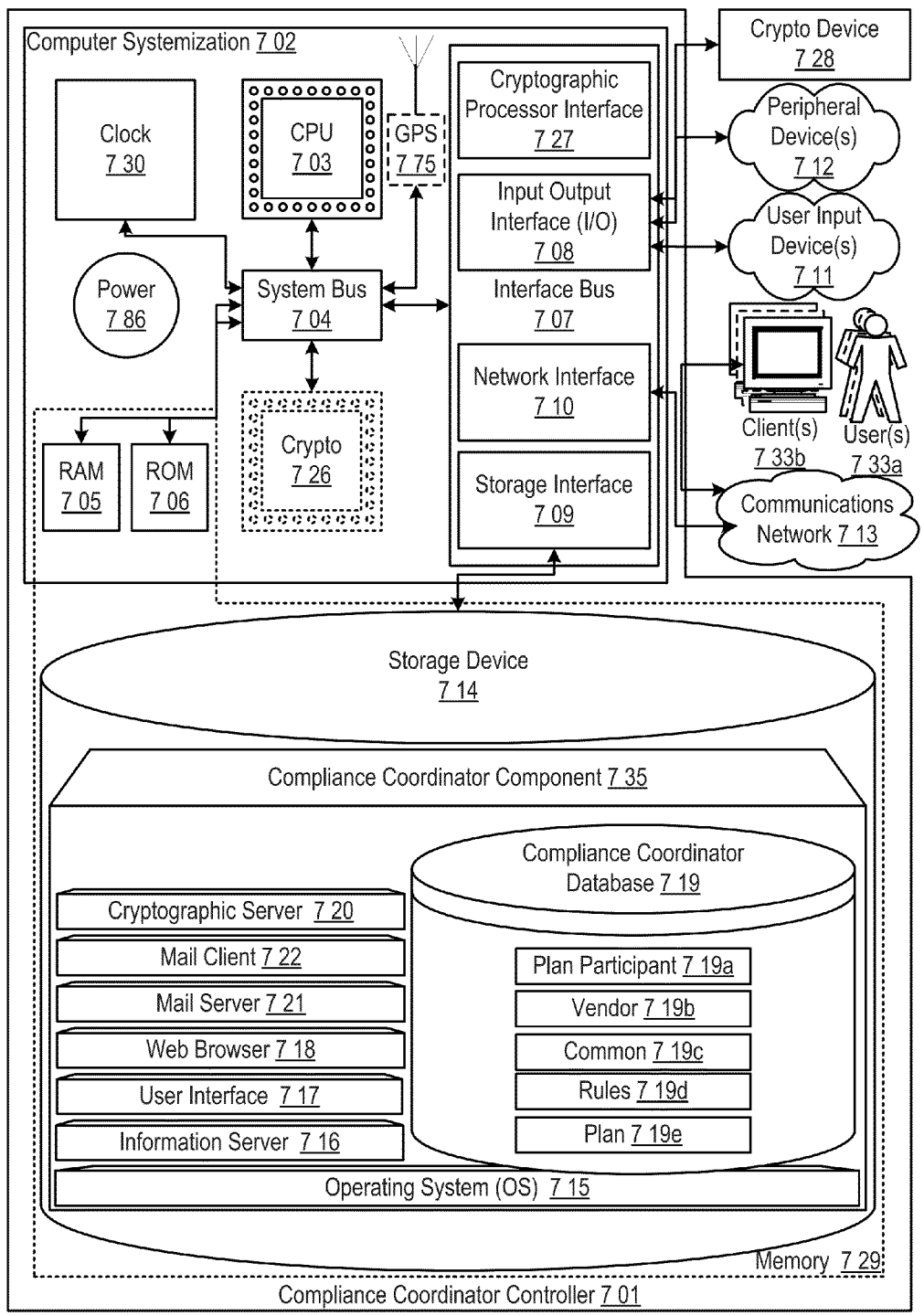
FIG. 7 is of a block diagram illustrating embodiments of the Compliance Coordinator controller.

FIG. 7 illustrates inventive aspects of a Compliance Coordinator controller 701 in a block diagram. In this embodiment, the Compliance Coordinator controller 701 may serve to aggregate, process, store, search, serve, identify, instruct, generate, match, and/or facilitate interactions with a computer through compliance coordinating technologies, and/or other related data.

Typically, users, which may be people and/or other systems, may engage information technology systems (e.g., computers) to facilitate information processing. In turn, computers employ processors to process information; such processors 703 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 729 (e.g., registers, cache memory, random access memory, etc.). Such communicative instructions may be stored and/or transmitted in batches (e.g., batches of instructions) as programs and/or data components to facilitate desired operations. These stored instruction codes, (e.g., programs) may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the Compliance Coordinator controller 701 may be connected to and/or communicate with entities such as, but not limited to: one or more users from user input devices 711; peripheral devices 712; an optional cryptographic processor device 728; and/or a communications network 713.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Compliance Coordinator controller 701 may be based on computer systems that may comprise, but are not limited to, components such as: a computer systemization 702 connected to memory 729.

Computer Systemization

A computer systemization 702 may comprise a clock 730, a central processing unit ("CPU(s)" and/or "processor(s)" (these terms are used interchangeably throughout the disclosure unless noted to the contrary)) 703, a memory 729 (e.g., a read only memory (ROM) 706, a random access memory (RAM) 705, etc.), and/or an interface bus 707, and most frequently, although not necessarily, all are interconnected and/or communicating through a system bus 704 on one or more (mother)board(s) having conductive and/or otherwise transportive circuit pathways through which instructions (e.g., binary encoded signals) may travel to effect communications, operations, storage, etc. Optionally, the computer systemization may be connected to an internal power source 786. Optionally, a cryptographic processor 726 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 729 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM's and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the Compliance Coordinator controller and beyond through various interfaces. Should processing requirements dictate a greater amount speed and/or capacity, distributed processors (e.g., distributed Compliance Coordinator), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the Compliance Coordinator may be achieved by implementing a microcontroller such as CAST's R8051XC2 microcontroller; Intel's MCS 51 (i.e., 8051 microcontroller); and/or the like. Also, to implement certain features of the Compliance Coordinator, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the Compliance Coordinator component collection (distributed or otherwise) and/or features may be implemented via the microprocessor and/or via embedded components; e.g., via ASIC, coprocessor, DSP, FPGA, and/or the like. Alternately, some implementations of the Compliance Coordinator may be implemented with embedded components that are configured and used to achieve a variety of features or signal processing.

Depending on the particular implementation, the embedded components may include software solutions, hardware solutions, and/or some combination of both hardware/software solutions. For example, Compliance Coordinator features discussed herein may be achieved through implementing FPGAs, which are semiconductor devices containing programmable logic components called "logic blocks," and programmable interconnects, such as the high performance FPGA Virtex series and/or the low cost Spartan series manufactured by Xilinx. Logic blocks and interconnects can be programmed by the customer or designer, after the FPGA is manufactured, to implement any of the Compliance Coordinator features. A hierarchy of programmable interconnects allow logic blocks to be interconnected as needed by the Compliance Coordinator system designer/administrator, somewhat like a one-chip programmable breadboard. An FPGA's logic blocks can be programmed to perform the function of basic logic gates such as AND and XOR, or more complex combinational functions such as decoders or simple mathematical functions. In most FPGAs, the logic blocks also include memory elements, which may be simple flip-flops or more complete blocks of memory. In some circumstances, the Compliance Coordinator may be developed on regular FPGAs and then migrated into a fixed version that more closely resembles ASIC implementations. Alternate or coordinating implementations may migrate Compliance Coordinator controller features to a final ASIC instead of or in addition to FPGAs. Depending on the implementation, all of the aforementioned embedded components and microprocessors may be considered the "CPU" and/or "processor" for the Compliance Coordinator.

Power Source

The power source 786 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 786 is connected to at least one of the interconnected subsequent components of the Compliance Coordinator thereby providing an electric current to all subsequent components. In one example, the power source 786 is connected to the system bus component 704. In an alternative embodiment, an outside power source 786 is provided through a connection across the I/O 708 interface. For example, a USB and/or IEEE 1394 connection carries both data and power across the connection and is therefore a suitable source of power.

Interface Adapters

Interface bus(es) 707 may accept, connect, and/or communicate to a number of interface adapters, conventionally although not necessarily in the form of adapter cards, such as but not limited to: input output interfaces (I/O) 708, storage interfaces 709, network interfaces 710, and/or the like. Optionally, cryptographic processor interfaces 727 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 709 may accept, communicate, and/or connect to a number of storage devices such as, but not limited to: storage devices 714, removable disc devices, and/or the like. Storage interfaces may employ connection protocols such as, but not limited to: (Ultra) 17 (Serial) Advanced Technology Attachment (Packet Interface) ((Ultra) (Serial) ATA(PI)), 18 (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 710 may accept, communicate, and/or connect to a communications network 713. Through a communications network 713, Compliance Coordinator controller is accessible through remote clients 733*b* (e.g., computers with web browsers) by users 733*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., distributed Compliance Coordinator) architectures may similarly be employed to pool, load balance, and/or otherwise increase the communicative bandwidth required by the Compliance Coordinator controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to, a Wireless Application Protocol (WAP), I-mode, and/or the like); and/or the like. A network interface may be regarded as a specialized form of an input output interface. Further, multiple network interfaces 710 may be used to engage with various communications network types 713. For example, multiple network interfaces may be employed to allow for the communication over broadcast, multicast, and/or unicast networks.

Input output interfaces (I/O) 708 may accept, communicate, and/or connect to user input devices 711, peripheral devices 712, cryptographic processor devices 728, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 711 may be card readers, dongles, finger print readers, gloves, graphics tablets, joysticks, keyboards, mouse (mice), remote controls, retina readers, trackballs, trackpads, and/or the like.

Peripheral devices 712 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the Compliance Coordinator controller may be embodied as an embedded, dedicated, and/or monitor-less (i.e., headless) device, wherein access would be provided over a network interface connection.

Cryptographic units such as, but not limited to, microcontrollers, processors 726, interfaces 727, and/or devices 728 may be attached, and/or communicate with the Compliance Coordinator controller. A MC68HC16 microcontroller, manufactured by Motorola Inc., may be used for and/or within cryptographic units. The MC68HC 16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allow for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 729. However, memory is a fungible technology and resource, thus, any number of memory embodiments may be employed in lieu of or in concert with one another. It is to be understood that the Compliance Coordinator controller and/or a computer systemization may employ various forms of memory 729. For example, a computer systemization may be configured wherein the functionality of on-chip CPU memory (e.g., registers), RAM, ROM, and any other storage devices are provided by a paper punch tape or paper punch card mechanism; such an embodiment would result in an extremely slow rate of operation. In a typical configuration, memory 729 will include ROM 706, RAM 705, and a storage device 714. A storage device 714 may be any conventional computer system storage. Storage devices may include a drum; a (fixed and/or removable) magnetic disk drive; a magneto-optical drive; an optical drive (i.e., Blueray, CD ROM/RAM/Recordable (R)/ ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 729 may contain a collection of program and/or database components and/or data such as, but not limited to: operating system component(s) 715 (operating system); information server component(s) 716 (information server); user interface component(s) 717 (user interface); Web browser component(s) 718 (Web browser); database(s) 719; mail server component(s) 721; mail client component(s) 722; cryptographic server component(s) 720 (cryptographic server); Compliance Coordinator component(s) 735; and/or the like (i.e., collectively a component collection). These components may be stored and accessed from the storage devices and/or from storage devices accessible through an interface bus. Although non-conventional program components such as those in the component collection typically are stored in a local storage device 714, they may also be loaded and/or stored in memory such as: peripheral devices, RAM, remote storage facilities through a communications network, ROM, various forms of memory, and/or the like.

Operating System

The operating system component 715 is an executable program component facilitating the operation of the Compliance Coordinator controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/ NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Compliance Coordinator controller to communicate with other entities through a communications network 713. Various communication protocols may be used by the Compliance Coordinator controller as a subcarrier transport mechanism for interaction, such as, but not limited to: multicast, TCP/IP, UDP, unicast, and/or the like.

Information Server

An information server component 716 is a stored program component that is executed by a CPU. The information server may be a conventional Internet information server such as, but not limited to, Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers and allows for the manipulated generation of the Web pages through interaction with other program components. After a Domain Name System (DNS) resolution portion of an HTTP request is resolved to a particular information server, the information server resolves requests for information at specified locations on the Compliance Coordinator controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information 8 "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Compliance Coordinator database 719, operating systems, other program components, user interfaces, Web browsers, and/or the like.

Access to the Compliance Coordinator database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Compliance Coordinator In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Compliance Coordinator as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 717 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact with, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 718 is a stored program component that is executed by a CPU. The Web browser may be a conventional hypertext viewing application such as Microsoft Internet Explorer or Netscape Navigator. Secure Web browsing may be supplied with bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. In place of a Web browser and information server, a combined application may be developed to perform similar functions of both. The combined application would similarly affect the obtaining and the provision of information to users, user agents, and/or the like from the Compliance Coordinator enabled nodes. The combined application may be nugatory on systems employing standard Web browsers.

Mail Server

A mail server component 721 is a stored program component that is executed by a CPU 703. The mail server may be a conventional Internet mail server such as, but not limited to, sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Compliance Coordinator.

Access to the Compliance Coordinator mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 722 is a stored program component that is executed by a CPU 703. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 720 is a stored program component that is executed by a CPU 703, cryptographic processor 726, cryptographic processor interface 727, cryptographic processor device 728, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one-way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Compliance Coordinator may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing an MD5 hash to obtain a unique signature for an digital audio file. A cryptographic component may communicate to and/or with other components in a component collection, including itself, and/ or facilities of the like. The cryptographic component supports encryption schemes allowing for the secure transmission of information across a communications network to enable the Compliance Coordinator component to engage in secure transactions if so desired. The cryptographic component facilitates the secure accessing of resources on the Compliance Coordinator and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Compliance Coordinator Database

The Compliance Coordinator database component 719 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Compliance Coordinator database may be implemented using various standard data-structures, such as an array, hash, (linked) list, struct, structured text file (e.g., XML), table, and/or the like. Such data-structures may be stored in memory and/or in (structured) files. In another alternative, an object-oriented database, such as Frontier, ObjectStore, Poet, Zope, and/or the like, may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the Compliance Coordinator database is implemented as a data-structure, the use of the Compliance Coordinator database 719 may be integrated into another component such as the Compliance Coordinator component 735. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 719 includes several tables 719a-e. A Plan Participant table 719a may include fields such as, but not limited to: a plan participant ID, plan participant name, social security number, credit card number, contact information, plan ID(s), account ID(s), loans, hardship withdrawals, vendor ID(s), compliance status, plan sponsor ID, plan sponsor name, plan sponsor contact information, and/or the like. The Plan Participant table may support and/or track multiple entity accounts on a Compliance Coordinator. A Vendor table 719b may include fields such as, but not limited to: vendor ID, vendor name, vendor contact information, vendor rules, access and/or reporting restrictions, plan ID(s), plan participant ID(s), plan sponsor ID(s), loans, hardship withdrawals, data extraction and/or feed schedules, security and/or authentication data, formatting information, and/or the like. A Common table 719c may include fields such as, but not limited to: vendor ID, plan ID(s), plan participant ID(s), plan sponsor ID(s), loans, hardship withdrawals, account values, compliance statuses, and/or the like. A Rules table 719d may include fields such as, but not limited to: rule ID, rule name, rule type, rule description, rule input fields, rule output, and/or the like. A Plan table 719e may include fields such as, but not limited to: plan ID, plan type, plan name, plan terms, plan restrictions, vendor ID(s), plan participant ID(s), plan sponsor ID(s), rule ID(s), loans, hardship withdrawals, and/or the like.

In one embodiment, the Compliance Coordinator database may interact with other database systems. For example, employing a distributed database system, queries and data access by search Compliance Coordinator component may render the combination of the Compliance Coordinator database and integrated data security layer database a single database entity.

In one embodiment, user programs may contain various user interface primitives, which may serve to update the Compliance Coordinator Also, various accounts may require custom database tables depending upon the environments and the types of clients the Compliance Coordinator may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 719a-e. The Compliance Coordinator may be configured to keep track of various settings, inputs, and parameters via database controllers.

The Compliance Coordinator database may communicate to and/or with other components in a component collection, including itself, and/or facilities of the like. Most frequently, the Compliance Coordinator database communicates with the Compliance Coordinator component, other program components, and/or the like. The database may contain, retain, and provide information regarding other nodes and data.

The Compliance Coordinators

The Compliance Coordinator component 735 is a stored program component that is executed by a CPU. In one embodiment, the Compliance Coordinator component incorporates any and/or all combinations of the aspects of the Compliance Coordinator that was discussed in the previous figures. As such, the Compliance Coordinator affects accessing, obtaining and the provision of information, services, transactions, and/or the like across various communications networks.

The Compliance Coordinator component enables the extraction, formatting, aggregation, normalization, and analysis of plan data, as well as the analysis of compliance statuses, generation and provision of reports and user interfaces, cohesive interaction of multiple plan vendors in a single framework, prevention of non-compliant financial activity requests, and/or the like and use of the Compliance Coordinator.

The Compliance Coordinator component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the Compliance Coordinator server employs a cryptographic server to encrypt and decrypt communications. The Compliance Coordinator component may communicate to and/or with other components in a component collection, including itself, and/or facilities of the like. Most frequently, the Compliance Coordinator component communicates with the Compliance Coordinator database, operating systems, other program components, and/or the like. The Compliance Coordinator may contain, communicate, generate, obtain, and/or provide program component, system, user, and/or data communications, requests, and/or responses.

Distributed Compliance Coordinators

The structure and/or operation of any of the Compliance Coordinator node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the Compliance Coordinator controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination of a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like, Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse communications data. Further, the parsing grammar may be used beyond message parsing, but may also be used to parse: databases, data collections, data stores, structured data, and/or the like. Again, the desired configuration will depend upon the context, environment, and requirements of system deployment.

The entirety of this application (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A compliance coordinating processor-implemented method, comprising:
   receiving financial plan activity data associated with at least one financial plan participant from a plurality of financial plan vendors;
   normalizing the financial plan activity data via the processor;
   consolidating the financial plan activity data into a regulatory compliance format to yield consolidated multi-vendor financial plan activity data; and
   providing the consolidated multi-vendor financial plan activity data for determination of a multi-vendor compliance status associated with a financial activity request; and
   instructing a provision of a refund or a rejection to the financial plan participant when the multi-vendor compliance status indicates that a contribution limit has been exceeded.

2. The method of claim 1, wherein the providing the consolidated multi-vendor financial plan activity data for determination of a multi-vendor compliance status associated with a financial activity request further comprises:
   analyzing the financial plan activity data based on a set of regulatory compliance rules;
   determining a multi-vendor compliance status based on the analyzing.

3. The method of claim 2, further comprising:
   generating a multi-vendor compliance status report based on the determined multi-vendor compliance status.

4. The method of claim 1, wherein the providing the consolidated multi-vendor financial plan activity for determination of a multi-vendor compliance status associated with a financial activity data request further comprises:
   generating an activity report based on the consolidated multi-vendor financial plan activity data;
   providing the activity report to at least one financial plan vendor of the plurality of financial plan vendors.

5. The method of claim 4, wherein the activity report contains only as much of the consolidated multi-vendor financial plan activity data as needed by the at least one financial plan vendor to allow the at least one financial plan vendor to determine the multi-vendor compliance status.

6. The method of claim 1, wherein the financial plan activity is associated with a retirement savings account.

7. The method of claim 6, wherein the retirement savings account is any retirement savings plan.

8. The method of claim 6, wherein the retirement savings account is a 403(b) plan.

9. The method of claim 1, wherein the financial activity request comprises a loan request.

10. The method of claim 9, wherein the financial plan activity data comprises prior loan withdrawals; and
    wherein the providing the consolidated multi-vendor financial activity data for determination of a multi-vendor compliance status associated with a financial activity request further comprises:
      summing prior loan withdrawals to yield a total loan withdrawal;
      comparing the total loan withdrawal with a total loan withdrawal limit; and
      determining a multi-vendor compliance status based on the comparing, wherein the loan request is determined to be non-compliant if the total loan withdrawal is equal to or greater than the total loan withdrawal limit.

11. The method of claim 1, wherein the financial activity request comprises a hardship withdrawal request.

12. The method of claim 11, wherein the normalized, multi-vendor consolidated multi-vendor financial activity data comprises prior loan withdrawals; and
    wherein the providing the consolidated multi-vendor financial activity data for determination of a multi-vendor compliance status associated with a financial activity request further comprises:
      summing prior loan withdrawals to yield a total loan withdrawal;
      comparing the total loan withdrawal with a total loan withdrawal limit; and
      determining a multi-vendor compliance status based on the comparing, wherein the hardship withdrawal request is determined to be non-compliant if the total loan withdrawal is less than the total loan withdrawal limit.

13. The method of claim 11, wherein the financial activity data comprises a date of most recent hardship withdrawal; and
    wherein the providing the consolidated multi-vendor financial activity data for determination of a multi-vendor compliance status associated with a financial activity request further comprises:
      adding a suspension period to the most recent hardship withdrawal to yield an earliest allowed contribution date;
      comparing a current date to the earliest contribution date; and
      determining a multi-vendor compliance status based on the comparing, wherein the contribution withdrawal request is determined to be non-compliant if the current date is before the earliest allowed contribution date.

14. The method of claim 1, wherein normalizing the consolidated multi-vendor financial plan activity data comprises:
    converting the consolidated multi-vendor financial plan activity data into a format based on the Best Practices for 403(b) Plans Information Sharing standards set by the Society of Professional Asset Managers and Record Keepers.

15. The method of claim 1, wherein the receiving financial plan activity data associated with at least one financial plan participant from a plurality of financial plan vendors includes at least one security feature commensurate with Gramm-Leach-Bliley Financial Services Modernization Act privacy standards.

16. The method of claim 1, further comprising:
    updating an audit trail based on the receiving financial plan activity data.

17. The method of claim 1, wherein receiving financial plan activity data associated with at least one financial plan participant from a plurality of financial plan vendors occurs periodically.

18. The method of claim 1, further comprising:
receiving a multi-vendor compliance determination request; and
wherein providing the consolidated multi-vendor financial plan activity data occurs in response to the received multi-vendor compliance determination request.

19. The method of claim 1, further comprising:
receiving a plan participant identifier;
searching records associated with the plurality of financial plan vendors to identify a subset of vendors holding accounts associated with the plan participant identifier; and
retrieving at least some of the financial plan activity data from the subset of vendors.

20. The method of claim 1, further comprising:
determining whether to approve and process the financial activity request based on compliance regulations.

21. The method of claim 1, further comprising:
storing the financial plan activity data in a common database that also maintains information on at least one of compliance conditions, vendor rules, plan rules, and IRS regulations.

22. The method of claim 1, wherein the multi-vendor compliance status is determined to be non-compliant when at least one financial plan activity metric derived from the consolidated multi-vendor financial plan activity data exceeds a multi-vendor financial activity limit.

23. The method of claim 1, wherein consolidating further comprises:
receiving financial plan activity data input from a first financial plan vendor and at least one separate financial plan vendor;
performing at least one operation on the financial plan activity data input from the first financial plan vendor and the at least one separate financial plan vendor to yield consolidated multi-vendor financial plan activity data incorporating the data obtained from both the first financial plan vendor and the at least one separate financial plan vendor.

24. A compliance coordinating apparatus, comprising:
a memory;
a processor disposed in communication with said memory, and configured to issue a plurality of processing instructions stored in the memory, wherein the processor issues instructions to:
receive financial plan activity data associated with at least one financial plan participant from a plurality of financial plan vendors;
normalize the financial plan activity data;
consolidate the financial plan activity data into a regulatory compliance format to yield consolidated multi-vendor financial plan activity data; and
provide the consolidated multi-vendor financial plan activity data for determination of a multi-vendor compliance status associated with a financial activity request; and
instruct payment a provision of a refund or a rejection to the financial plan participant when the multi-vendor compliance status indicates that a contribution limit has been exceeded.

25. A compliance coordinating non-transitory processor-readable medium storing a plurality of instructions, comprising issuable instructions by a processor to:
receive financial plan activity data associated with at least one financial plan participant from a plurality of financial plan vendors;
normalize the financial plan activity data;
consolidate the financial plan activity data into a regulatory compliance format to yield consolidated multi-vendor financial plan activity data; and
provide the consolidated multi-vendor financial plan activity data for determination of a multi-vendor compliance status associated with a financial activity request; and
instruct a provision of a refund or a rejection to the financial plan participant when the multi-vendor compliance status indicates that a contribution limit has been exceeded.

* * * * *